United States Patent
Hiltgen et al.

(10) Patent No.: US 10,095,532 B2
(45) Date of Patent: Oct. 9, 2018

(54) PROVIDING EXCESS COMPUTE RESOURCES WITH VIRTUALIZATION

(71) Applicant: Netkine, Inc., Redwood City, CA (US)

(72) Inventors: Daniel Hiltgen, Los Altos, CA (US); Patrick Devine, Palo Alto, CA (US); Erik P. Papp, Los Gatos, CA (US); Mustafa Jamil, Fremont, CA (US)

(73) Assignee: Netkine, Inc., Redwood City, CA (US)

( * ) Notice: Subject to any disclaimer, the term of this patent is extended or adjusted under 35 U.S.C. 154(b) by 139 days.

(21) Appl. No.: 14/697,203

(22) Filed: Apr. 27, 2015

(65) Prior Publication Data

US 2015/0309829 A1   Oct. 29, 2015

Related U.S. Application Data

(60) Provisional application No. 61/985,392, filed on Apr. 28, 2014.

(51) Int. Cl.
  *G06F 9/455* (2018.01)

(52) U.S. Cl.
  CPC ...... *G06F 9/45545* (2013.01); *G06F 9/45533* (2013.01); *G06F 2009/45562* (2013.01)

(58) Field of Classification Search
  CPC .................. G06F 9/45533; G06F 2009/45562
  USPC ............................................................. 718/1
  See application file for complete search history.

(56) References Cited

U.S. PATENT DOCUMENTS

| | | | |
|---|---|---|---|
| 8,024,442 B1 | 9/2011 | Roussos et al. | |
| 9,128,745 B2 * | 9/2015 | Crudele | G06F 9/45558 |
| 2006/0256105 A1 | 11/2006 | Scarlata et al. | |
| 2009/0113423 A1 | 4/2009 | Hiltgen et al. | |
| 2010/0306764 A1 * | 12/2010 | Khanna | G06F 11/1482 718/1 |
| 2011/0023029 A1 * | 1/2011 | Diab | G06F 9/5077 718/1 |
| 2011/0061045 A1 | 10/2011 | Phillips | |
| 2011/0265076 A1 | 10/2011 | Thorat et al. | |

(Continued)

OTHER PUBLICATIONS

"Amazon EC2 [Elastic Compute Cloud]"; Amazon Web Services website (aws.amazon.com) as captured by the Wayback Machine Internet archive (archive.org) on Apr. 21, 2015.*

(Continued)

*Primary Examiner* — Qing Chen
*Assistant Examiner* — Clint A Thatcher
(74) *Attorney, Agent, or Firm* — Hickman Palermo Becker Bingham LLP

(57) ABSTRACT

A main operating system interface engine can be configured to receive instructions from a main operating system of one or more host systems and can manage a virtualized operating system on the one or more host systems, the virtualized operating system appearing distinct from the main operating system to a user of the one or more host systems. A virtualization environment management engine can manage a virtualization environment, the virtualization environment using the virtualized operating system. A virtual machine management engine can manage one or more virtual machine instances in the virtualization environment, each of the one or more virtual machine instances operative to provide virtualized resources of the one or more host systems for a compute access system coupled to the one or more host systems.

42 Claims, 27 Drawing Sheets

(56) References Cited

U.S. PATENT DOCUMENTS

| | | |
|---|---|---|
| 2011/0276621 A1 | 11/2011 | Edery et al. |
| 2012/0023507 A1 | 1/2012 | Travis |
| 2013/0179651 A1 | 7/2013 | Shatz |
| 2013/0311778 A1 | 11/2013 | Cherukuri et al. |
| 2014/0040887 A1 | 2/2014 | Morariu et al. |
| 2014/0115028 A1* | 4/2014 | Taylor .................. H04L 67/141 709/202 |
| 2014/0278623 A1* | 9/2014 | Martinez ................ G06Q 10/06 705/7.12 |
| 2015/0186176 A1* | 7/2015 | Kodi .................. G06F 9/45558 718/1 |
| 2016/0378522 A1* | 12/2016 | Kaplan ............... G06F 9/45558 718/1 |
| 2017/0168907 A1* | 6/2017 | Harper ................ G06F 11/2033 |

OTHER PUBLICATIONS

International Searching Authority, "International Preliminary Report on Patentability", in application No. PCT/US2015/028073, dated Aug. 20, 2015, 12 pages.
Current Claims in application No. PCT/US2015/028073, dated Aug. 2015, 7 pages.
International Searching Authority, "Search Report" in application No. PCT/US2015/028073, dated Aug. 20, 2015, 29 pages.
Claims in application No. PCT/US2015/028073, dated Aug. 2015, 8 pages.
European Patent Office, "Search Report" in application No. 15785730.1-1224, dated Feb. 28, 2018, 14 pages.
European Claims in application No. 15785730.1-1224, dated Feb. 2018, 3 pages.

* cited by examiner

PROVIDING EXCESS COMPUTE RESOURCES WITH VIRTUALIZATION

CROSS REFERENCE TO RELATED APPLICATIONS

This claims the benefit of U.S. Provisional Patent Application Ser. No. 61/985,392, filed on Apr. 28, 2014, entitled "PROVIDING EXCESS COMPUTE RESOURCES WITH VIRTUALIZATION," which is incorporated herein by reference.

BACKGROUND

Virtualization techniques form an important part of many systems, including cloud-based computing systems that provide services to clients over a networked connection. More specifically, in many systems, virtualization techniques allow a first set of devices, known as virtualization servers, to virtualize resources and provide those virtualized resources to a second set of devices, known as virtualization clients. The virtualization servers typically reside in locations that support fast processing speeds, have large memory and storage capacities, and have access to fast and reliable networks. As a result, many virtualization servers and virtualization services are resource-intensive operations. Further, many virtualization servers and virtualization services are under the control of a few entities who have the resources to manage them.

The few entities that provide virtualization services can control the supply of virtual machines. More specifically, most virtualization servers are executed on servers within the ownership or physical control of major virtualization service providers. This can form a bottleneck in the market for virtualization services. The major virtualization service providers have the power to turn virtual machines on or off at any time. the major virtualization service providers can also determine what types of virtualization services are available to various customers at a given time. As a result, the major virtualization service providers can control the supply of virtual machines at a given time or for a given geographic area. Due to basic economics and other factors, present virtualization systems allow a few major entities to control the price of virtual machines. Such a regime can prove disastrous, particularly when the demise of network neutrality rules is considered. More specifically, with the demise of network neutrality rules, those without preferential tiers of network access can find the virtual machines in datacenters to be slow or inefficient. Network systems that are more efficient and/or effective would be helpful.

SUMMARY

In various implementations, a virtualized compute environment containing one or more host systems, one or more compute access systems, and a virtualized compute control and management system are provided. The host systems can include virtualization environment engines to maintain a virtualization environment thereon. The virtualization environment can maintain one or more virtual machine instances to virtualize resources of the host systems. Hardware and/or software of the host systems can be virtualized using the virtual machine instances. The virtualized resources can be provided to the a virtualized compute client engine in the compute access systems over network. In some implementations, the virtualization environment engines are coupled to one another with a virtual/logical network that provides for peer-to-peer storage, peer-to-peer transfer of data, and other data communications. The virtualized compute client engine can include any application or process that allows a user of the compute access system to access the virtualized resources. The virtualized compute control and management system can include any computer system to control and/or manage the functionalities of the virtualization environment engines and/or the virtualized compute access engines.

In a specific implementation, the virtualization environment engine can facilitate installation of a virtualized compute operating system, can interface with a main operating system of the host systems, can manage the virtualization environment and/or the virtual machine instances thereon. The virtualization environment engine can also manage virtual machine state data and/or virtualization environment security. The virtualization environment engine can be used to manage one or more virtual machine instances in a virtualization environment, securely access nested files, manage state in the virtualization environment engine, upload data to the virtualized compute control and management system and/or other virtualization environments, etc.

In an implementation, the virtualized compute control and management system can help facilitate installations of virtualization environments on host systems, control virtual machine instances, facilitate providing virtualization services to compute access clients, and facilitate access to virtual machine instances by compute access clients. The virtualized compute control and management system can also manage peer-to-peer and/or other networks between virtualization environments. In some implementations, the virtualized compute control and management system provides various virtual machine classes depending on the needs of specific compute access systems. The virtualized compute control and management system can further provide a marketplace for virtualized compute instances. Such a marketplace can use various auction-based sales methodologies or other methodologies.

Many other features and implementations will be apparent from the accompanying drawings and from the following detailed description.

Figure 1:
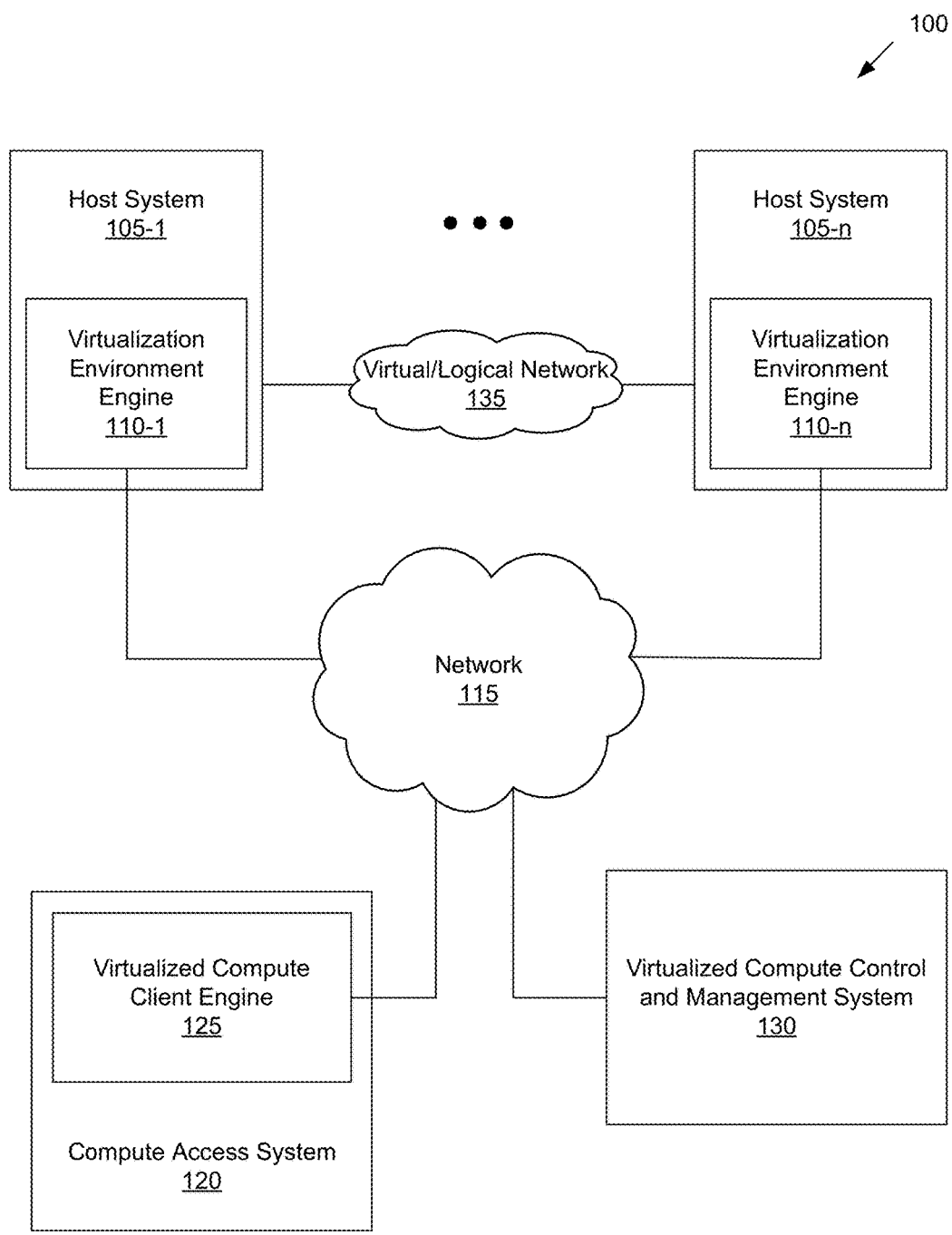
FIG. 1 depicts a diagram illustrating an example of a virtualized compute environment.

The figures depict various implementations for purposes of illustration only, wherein the figures use like reference numerals to identify like elements. One skilled in the art will readily recognize from the following discussion that alternative implementations of the structures and methods illustrated in the figures can be employed without departing from the principles of the disclosed technology described herein.

DETAILED DESCRIPTION OF THE DRAWINGS

FIG. 1 depicts a diagram 100 illustrating an example of a virtualized compute environment. In the example of FIG. 1, the virtualized compute environment includes a first host system 105-1 through an nth host system 105-n (referred to collectively as "host systems 105" and/or individually as a "host system 105" in this paper), a network 115, a compute access system 120, a virtualized compute control and management system 130, and a virtual/logical network 135. As discussed further in this paper, the virtualized compute environment can support a virtualization environment with virtual machines instances that can be accessed the compute access system 120.

In the example of FIG. 1, the host system 105 is coupled to the network 115. In a specific implementation, the host system 105 includes a device with a processor and a memory. The host system 105 can, in various implementations, include some or all of the components of the computer system 3000, shown in FIG. 30. The host system 105 can include, by way of example but not limitation: a smartphone, a tablet computing device, a laptop computer, a dedicated server, a desktop computer, a gaming console, or other applicable digital device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can have centralized or distributed functionality. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

In an implementation, the host system 105 includes a virtualization environment engine 110. More specifically, the first host system 105-1 can include a first virtualization environment engine 110-1, and the nth host system 105-n includes an nth virtualization environment engine 110-n. In an implementation, the virtualization environment engine 110 includes an "engine," and a "datastore."

A "datastore," as used in this paper, can be implemented as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper. Datastores can include data structures. As used in this paper, a data structure is associated with a particular way of storing and organizing data in a computer so it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures for creating and manipulating instances of that structure.

In an implementation, the virtualization environment engine 110 supports a virtualization environment that is secure from other processes on the host system 105. The virtualization environment can include a hypervisor, a sandboxed environment, or other environment that has processes that cannot be accessed by processes in the host system 105 that are outside the virtualization environment. In an implementation, when the host system 105 is booted, at least portions of the virtualization environment engine 110 can appear as a separate operating system. At least portions of the virtualization environment engine 110 can also have a file system that is transparent to the main operating system of the host system 105. For example, at least portions of the virtualization environment engine 110 can be implemented using a Linux kernel that appears as a distinct operating system to boot procedures of the host system 105. In this implementation, at least portions of the virtualization environment engine 110 can have a New Technology File System (NTFS) that appears as a file system to the main operating system of the host system 105. For example, at least portions of the virtualization environment engine 110 can appear to have an Extensible Firmware Interface (EFI) as an operating system distinct from the main operating system of the host systems 105, while the virtualization environment engine 110 can appear to disk partitioning and/or disk layout software as a file system on the host system 105. In some implementations, the virtualization environment engine 110 boots into an image that sits on the file system of the main operating system of the host system 105.

Though this discussion uses the phrase "main" operating system, it is noted various implementations apply to any applicable operating system of a set of operating systems on the host system 105, and which operating system is the "main" one, if any, is dependent upon implementation- and/or configuration-specific factors. For instance, the virtualization environment can comprise a Linux® kernel, while a main operating system of the host system 105 comprises a Windows®, Linux®, or Mac® operating system.

In the example of FIG. 1, the network 115 is coupled to the host system 105, to the compute access system 120, and to the virtualized compute control and management system 130. In a specific implementation, the network 115 includes a networked system including several computer systems coupled together, such as the Internet, or a device for coupling components of a single computer, such as a bus. The term "Internet" as used in this paper refers to a network of networks using certain protocols, such as the TCP/IP protocol, and possibly other protocols such as the hypertext transfer protocol (HTTP) for hypertext markup language (HTML) documents making up the World Wide Web (the web). Content is often provided by content servers, which are referred to as being "on" the Internet. A web server, which is one type of content server, is typically at least one computer system, which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the network 115 broadly includes, as understood from relevant context, anything from a minimalist coupling of the components illustrated in the example of FIG. 1, to every component of the Internet and networks coupled to the Internet. In some implementations, the network 115 is administered by a service provider, such as an Internet Service Provider (ISP).

In various implementations, the network 115 can include technologies such as Ethernet, 802.11, worldwide interoperability for microwave access (WiMAX), 3G, 4G, CDMA, GSM, LTE, digital subscriber line (DSL), etc. The network 115 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over network 115 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the network 115 includes a wired network using wires for at least some communications. In some implementations, the network 115 comprises a wireless network. A "wireless network," as used in this paper can include any computer network communicating at least in part without the use of electrical wires. In various implementations, the network 115 includes technologies such as Ethernet, 802.11, worldwide interoperability for microwave access (WiMAX), 3G, 4G, CDMA, GSM, LTE, digital subscriber line (DSL), etc. The network 115 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 115 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the wireless network of the network 115 is compatible with the 802.11 protocols specified by the Institute of Electrical and Electronics Engineers (IEEE). In a specific implementation, the wireless network of the network 115 is compatible with the 802.3 protocols specified by the IEEE. In some implementations, IEEE 802.3 compatible protocols of the network 115 can include local area network technology with some wide area network applications. Physical connections are typically made between nodes and/or infrastructure devices (hubs, switches, routers) by various types of copper or fiber cable. The IEEE 802.3 compatible technology can support the IEEE 802.1 network architecture of the network 115.

In the example of FIG. 1, the compute access system 120 is coupled to the network 115. In a specific implementation, the compute access system 120 includes an applicable device with a processor and a memory. For example, the compute access system 120 can include some or all of the components of the computer system 3000, shown in FIG. 30. The compute access system 120 can include, by way of example but not limitation, a smartphone, a tablet computing device, a laptop computer, a desktop computer, a game console, or other digital device.

In the example of FIG. 1, the compute access system 120 includes a virtualized compute client engine 125. In an implementation, the virtualized compute client engine 125 facilitates access to one or more virtual machine instances maintained on the virtualization environment engine 110. The virtualized compute client engine 125 can be implemented, in various implementations, as a standalone application on the compute access system 120, a portion of web page running on a web browser on the compute access system 120, a mobile application on the compute access system 120, etc. In various implementations, the virtualized compute client engine 125 includes processes and/or applications that use the services of virtual machine instances. For example, the virtualized compute client engine 125 can allow a user to access virtual machine instances on the virtualization environment engine 110.

In the example of FIG. 1, the virtualized compute control and management system 130 is coupled to the network 115. In a specific implementation, the virtualized compute control and management system 130 includes an applicable device with a processor and a memory. For example, the virtualized compute control and management system 130 can include some or all of the components of the computer system 3000, shown in FIG. 30. The virtualized compute control and management system 130 can include, by way of example but not limitation, a smartphone, a tablet computing device, a laptop computer, a desktop computer, a game console, or other digital device. In an implementation, the virtualized compute control and management system 130 allows a user to control the virtualization environment engine 110, the virtualized compute client engine 125, and/or the virtual/logical network 135.

In the example of FIG. 1, the virtual/logical network 135 couples the first virtualization environment engine 110-1 to the Nth virtualization environment engine 110-N. The virtual/logical network 135 can include resources that are accessible by the first virtualization environment engine 110-1 and/or the Nth virtualization environment engine 110-N. In an implementation, the virtual/logical network 135 can implement Generic Routing Encapsulation (GRE) and/or Internet Protocol Security (IPSec) tunnels to facilitate a secure connection between the first virtualization environment engine 110-1 and the Nth virtualization environment engine 110-N. In an implementation, the virtual/logical network 135 appears as a peer-to-peer connection between the first virtualization environment engine 110-1 and the Nth virtualization environment engine 110-N.

In various implementations, the virtual/logical network 135 facilitates transfer of data between the first virtualization environment engine 110-1 and to the Nth virtualization environment engine 110-N. Though FIG. 1 shows a single virtual/logical network 135, is it noted that in various implementations, the element 135 can designate a plurality of virtual/logical networks. The number of virtual/logical networks between virtualization environment engines can depend on various factors, including geography, similarity of computing devices, and other factors. For example, the number of virtual/logical networks between virtualization environment engines can depend on whether two virtualization environment engines reside in the same building or share a common VLAN, in certain implementations. Further, though FIG. 1 shows the virtual/logical network 135 as separate from the network 115, it is noted the virtual/logical network 135 can be a part of the network 115 in certain implementations.

In operation, the virtualized compute environment in the diagram 100 can provide the virtualized compute client engine 125 with access to virtual machines maintained on the virtualization environment engine 110. The virtualized compute control and management system 130 can control the virtual machines.

In operation, the virtualization environment engine 110 maintains a virtualization environment. The virtualization environment can be sandboxed and/or can be separated from the processes ordinarily run on the host system 105. In an implementation, the virtualization environment can require mutual authentication Transport Layer Security (TLS) for Application Programming Interface (API) calls. Further, the virtualization environment engine 110 can reserve at least some of the resources (e.g., some of the disk) of the host system 105 for virtual machine instances and workload data associated with these virtual machines. The reserved resources can take the form of a file system. The virtualization environment engine 110 can maintain one or more virtual machine instances in the virtualization environment. In an example of operation, the host systems 105 make virtual machine instances available to other machines to perform a task, such as a task utilizing cloud-based virtual machines. The virtualization environment engine 110 can also one of several tiered levels of security, as discussed in this paper. In various implementations, the virtualization environment engine 110 supports delayed uploading, maintaining and uploading only state changes, secure reading and writing to nested files, peer-to-peer storage through the virtual/logical network 135, and other features.

In operation, the compute access system 120 maintains the virtualized compute client engine 125. The virtualized compute client engine 125 facilitates access to virtual machine instances maintained on the virtualization environment engine 110. For example, the virtualized compute client engine 125 can access virtualized processors, virtualized memory, virtualized storage, and/or virtualized network resources emulated in the virtualization environment of the virtualization environment engine 110. The virtualized compute client engine 125 can provide a user with processes, applications, etc. that perform tasks using the virtual machine instances. As an example, the virtualized compute client engine 125 can provide an electronic commerce application that uses virtual resources maintained by the virtualization environment engine 110. As another example, the virtualized compute client engine 125 can provide a user interface for an application that performs computations (e.g., an application involving financial modeling, scientific computing, testing, media encoding, web crawling, distributed content delivery, rendering, and/or fault tolerance) based on the resources of the virtual machine instances maintained on the virtualization environment engine 110.

In operation, the virtualized compute control and management system 130 controls and/or manages the virtualization environment engine 110. In a specific implementation, the virtualized compute control and management system 130 supports operation of the virtualization environment engine 110. For example, the virtualized compute control and management system 130 can manage virtual machine instances, manage backup and/or state of virtual machine instances, can manage quality of service of virtual machine instances, and can manage workloads on virtual machine instances on the virtualization environment engine 110. As another example, the virtualized compute control and management system 130 can provide virtual machine instances to the virtualized compute client engine 125 based on one or more factors, such as supply for virtual machine instances and demand for virtual machine instances.

In some implementations, the virtualized compute control and management system 130 allocates one or more tiers of virtual machine instances depending on the types of services requested and/or paid for by a user of the virtualized compute client engine 125. For example, the virtualized compute control and management system 130 can allocate a less secure tier, or a more secure tier. A more secure tier can support secure functions from the host system 105, such as secure boot processes where boot loaders verify images signed by crypto key preprogrammed at factory. Under secure boot processes, only boot images that have chain of trust can boot; if the system is running with secure boot on, there can be a higher level of trust. A more secure tier can also support cryptographically signed chips, e.g., special crypto chip on mother or daughter board. Such cryptographically-signed chip can allow checksum or otherwise check content as desired. These can verify checksums. The image in these cases would be booted from secure hardware and would provide higher level of trust. In some implementations, the virtualized compute control and management system 130 runs in a "certified datacenter," such as a datacenter that has passed one or more predetermined tests in order to meet higher security standards.

Figure 2:
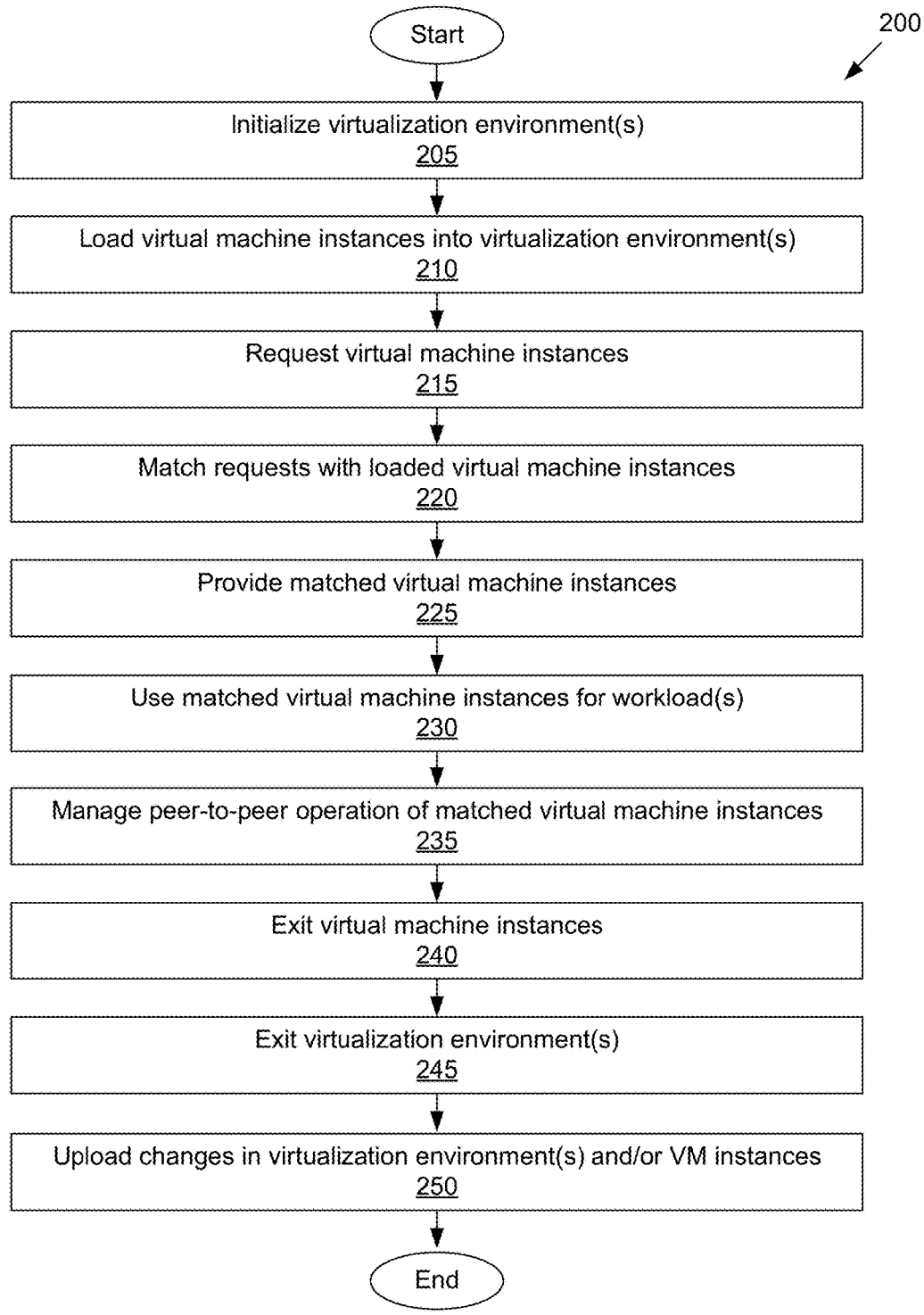
FIG. 2 depicts a flowchart illustrating an example of a method for managing virtual machines in a virtualized compute environment.

FIG. 2 depicts a flowchart 200 illustrating an example of a method for managing virtual machines in a virtualized compute environment. The flowchart 200 is discussed in conjunction with the virtualized compute environment shown in the diagram 100 in FIG. 1.

At block 205, one or more of the virtualization environment engines 110 is initialized. In a specific implementation, a user of the host systems 105 initializes the virtualization environment engine 110 through an application on the host systems 105. The virtualization environment engine 110 can also be initialized through boot loading sequences, etc. The virtualization environment engine 110 can also be loaded without human intervention through an automated process on the host system 105.

At block 210, the virtualized compute control and management system 130 loads virtual machine instances into the one or more virtualization environment engines 110. In an implementation, the virtualized compute control and management system 130 determines the quantity and quality (e.g., the security, speed, processing power, memory, storage, network capabilities, etc.) of virtual machine instances the virtualization environment 110 can support. Depending on the number and the quality of the virtual machine instances the virtualization environment 110 can support, the virtualized compute control and management system 130 can supply, the virtualized compute control and management system 130 can provide load virtual machine instances into the virtualization environment 110.

At block 215, the virtualized compute client engine 125 requests virtual machine instances. In an implementation, the compute access system 120 provides the virtualized compute client engine 125 with a request for virtual machine instances. The request can include the type and/or number of virtual machine instances the compute access system 120 requires for a particular task. For example, the compute access system 120 can request specific configurations of virtual processors, virtual memory, virtual storage, and/or virtual network connections. In some implementations, the request from the virtualized compute client engine 125 includes a bid for virtual machine instances. The bid can include a price and/or other consideration for the requested virtual machine instances.

At block 220, the virtualized compute control and management system 130 matches the requests with loaded virtual machine instances. In an implementation, the virtualized compute control and management system 130 utilizes an auction model to determine a price for the virtual machine instances requested by the virtualized compute client engine 125. For example, the virtualized compute control and management system 130 can determine a supply of virtual machine instances available at the time of the request from the virtualized compute client engine 125. The virtualized compute control and management system 130 can further analyze, based on the supply and/or the bid from the virtualized compute client engine 125.

At block 225, the virtualization environment engine 110 provides matched virtual machine instances to the virtualized compute client engine 125. In some implementations, the virtualization environment engine 110 receives instructions from the virtualized compute control and management system 130 to supply the requested number of virtual machine instances. Moreover, specific virtual machine instances maintained by the virtualization environment engine 110 can be linked to the virtualized compute client engine 125. In an implementation, a secure tunnel (e.g., a GRE or an IPSec tunnel) can be formed through the network 115. The secure tunnel can ensure workloads on the virtual machine instances are protected from unwanted intrusions, snooping, etc.

At block 230, the virtualization environment engine 110 uses the matched virtual machine instances for one or more workloads. In various implementations, the workloads are related to tasks requested by the virtualized compute client engine 125. When the workloads are running in the virtual machine instances, the virtualization environment of the virtualization environment engine 110 can be managed by the virtualization compute control and management system 130.

At block 235, the virtualized compute control and management system 130 manages peer-to-peer operation of the matched virtual machine instances. In various implementations, the virtual/logical network 135 maintains a peer-to-peer network between two of the virtualization environment engines 110 (e.g., the first virtualization environment engine 110-1 and the Nth virtualization environment engine 110-N). Peer-to-peer operation can include peer-to-peer storage, clustering, load balancing, multi-tenancy (e.g., multiple users sharing resources on a specific host), and other distributed operations between the two virtualization environment engines 110. The peer-to-peer operation can be managed with instructions from the virtualized compute control and management system 130.

At block 240, the virtualization environment engine 110 exits the virtual machine instances. The virtualization environment engine 110 can provide instructions to the virtual machine instances to save changes to virtual machine instances to a delta file, to end processes related to the virtual machine instances, and to clear virtual machine instances from the memory of the host systems 105. The virtualization environment engine 110 can also begin delayed uploading methods and/or methods of using the delta disk to back up the virtual machine instances, as described further in this paper. In various implementations, the virtual machine instances are terminated when workloads are finished, when time allocated to the virtualized compute client engine 125 has completed, and/or upon the occurrence of a predetermined event.

At block 245, the virtualization environment engine 110 exits the virtualization environment(s). The virtualization environment engine 110 can instruct the host systems 105 to save changes to the virtualization environment, to end processes related to the virtualization environment, and to clear data related to the virtualization environment from the memory of the host systems 105. The virtualization environment engine 110 can further continue delayed uploading methods and/or methods of using the delta disk to back up the virtual machine instances, as described further in this paper. In some implementations, the virtualization environment engine 110 reboots the host systems 105 so that a main operating system of the host systems 105 is loaded.

At block 250, the virtualization environment engine 110 uploads changes in the virtualization environment(s) and/or the virtual machine instances. In an implementation, the uploading can be part of a delayed uploading process. The changes can be uploaded to the virtualized compute control and management system 130, and/or other virtualization environment engines 110 through peer-to-peer mechanisms as discussed in this paper. In various implementations, the uploading continues after the main operating system of the host systems 105 has rebooted and loaded into memory. More specifically, the virtualization environment engine 110 can upload the changes to the virtual machine instances and/or the virtualization environment through a process that executes in the main operating system of the host system 105. The process can be encrypted so that its contents are secure from the user of the main operating system.

By managing the virtual machines in the virtualized compute environment shown in the diagram 100, the systems and method described in this paper address limitations related to virtualization techniques that require physical devices to reside in datacenters. More specifically, though existing systems of providing virtual machines have contributed to the progress of technology, existing systems of providing virtual machines leave much to be desired. First, existing systems of providing virtual machines are susceptible to price controls by a few major entities. More specifically, the management of a datacenter typically involves ensuring a facility has sufficient power and resources for many physical devices, has minimal downtime, and has implemented disaster recovery protocols. Conventionally, only a few major entities have had the ability to manage datacenters, and, ultimately, had the ability to control the supply of virtual machines that were available. These companies have had the ability to set the prices of virtual machines without giving full effect to other market forces that would benefit customers. Though some companies have divided the market for virtual machines into segments for virtual machines provided on-demand and segments for virtual machines provided as spot instances, these pricing systems are still subject to price controls that do not benefit customers.

Second, existing systems of providing virtual machines can be adversely affected by a lack of network neutrality. Some jurisdictions have limited the authority of government actors, such as the Federal Communications Commission (FCC), to regulate attributes of networks. Under various proposed network neutrality rules, network service providers can be allowed to provide preferential tiers of Internet service to entities such as major cable companies, major interactive media studios, and major streaming media companies. Other entities that do not receive preferential tiers of Internet service can experience slower and/or less reliable network connections, and consequently, slower and/or less reliable access to virtual machines.

Implementations of the virtualized compute environment shown in the diagram 100 advantageously leverage the insight that, nationally and internationally, there are many computers that are inactive and/or underutilized for extended periods of time. For example, a college student can be at her classes most of the day. She can only come home and turn on her personal computer in the evenings when she browses the Internet and accesses several social networking sites. While she is at her classes, her personal computer can be in a power management mode or can be off. As another example, a video game player can only turn on his video game console for a few hours in the morning before work. When he is at work, his video game console can be in a power management mode with full Internet connectivity. In each of these cases, a device having the ability to run workloads is underutilized. More specifically, in each of these cases, there are devices with more than sufficient processing power, memory, storage, and network speeds to host virtual machines. However, these devices are in effect underutilized for extended periods of time.

Implementations of the virtualized compute environment shown in the diagram 100 advantageously leverage the insight that there is a demand for virtual machines with different levels of reliability. For example, mission-critical or enterprise applications can require virtual machines with little downtime. Other applications (such as some applications involving financial modeling, scientific computing, testing, media encoding, web crawling, distributed content delivery, rendering, and/or fault tolerance) can be able to withstand momentary losses in the reliability virtual machines. Customers using virtual machines to implement mission-critical and/or enterprise applications can be willing to pay more for reliable virtual machines than customers using virtual machines to implement other applications. The implementations in the virtualized compute environment shown in the diagram 100 advantageously require very small capital investments compared to other infrastructure companies, allow for massive aggregated bandwidth across multiple networks, and low intra-network latencies, and can provide virtual machines in places that are not well service by existing datacenters. Advantages further include massive network effects and potential for supply-side lock-ins of people with excess compute.

Figure 3:
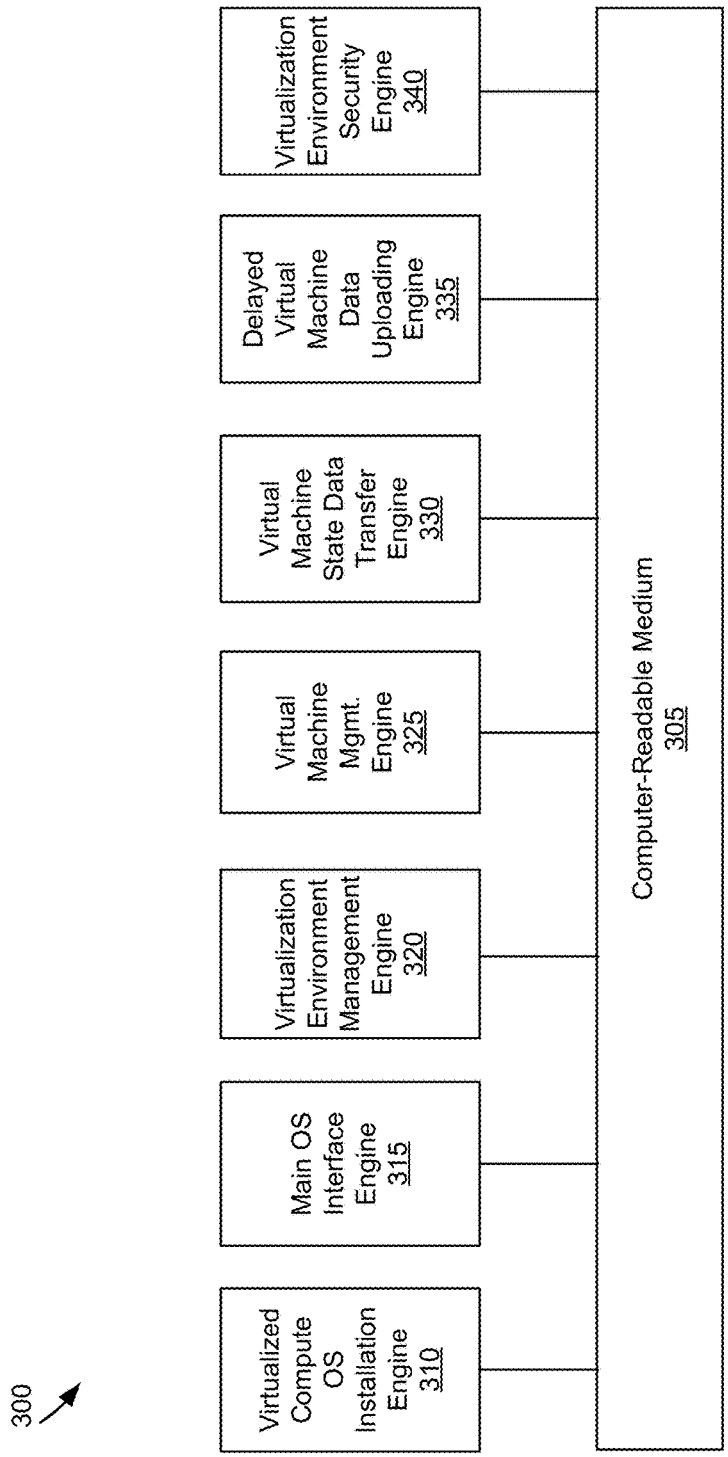
FIG. 3 depicts a diagram illustrating an example of a virtualization environment engine.

FIG. 3 depicts a diagram 300 illustrating an example of a virtualization environment engine. In a specific implementation, the virtualization environment engine corresponds to the virtualization environment engine 110, shown in FIG. 1. In the example of FIG. 2, the diagram 300 includes a computer-readable medium 305, a virtualization environment installation engine 310, a main OS interface engine 315, a virtualization environment management engine 320, a virtual machine management engine 324, a virtual machine state data transfer engine 330, a delayed virtual machine data uploading engine 335, and a virtualization environment security engine 340. The computer-readable medium 305 can be implemented as a "computer-readable medium" as defined in this paper. The virtualization environment installation engine 310, the main OS interface engine 315, the virtualization environment management engine 320, the virtual machine management engine 325, the virtual machine state data transfer engine 330, the delayed virtual machine data uploading engine 335, and the virtualization environment security engine 340 can be implemented as "engines" as discussed further in this paper.

In the example of FIG. 3, the virtualization environment installation engine 310 is coupled to the computer-readable medium 305. In an implementation, the virtualization environment installation engine 310 includes a file that supports installation of the virtualization environment on a host system containing the virtualization environment engine shown in the diagram 300. In some implementations, the virtualization environment installation engine 310 includes installation packages, and/or related relational databases (e.g., Component Object Model (COM) Structured Storages and/or Installer files). The virtualization environment installation engine 310 can be compatible with a primary operating system of the host system.

In the example of FIG. 3, the main OS interface engine 315 is coupled to the computer-readable medium 305. In an implementation, the main OS interface engine 315 includes a boot loader. The main OS interface engine 315 can interface with boot sequences of the host system. In some implementations, the main OS interface engine 315 allows selection of the virtualization environment or the main operating system of the host system during Basic Input/Output System (BIOS) operations. In various implementations, the main OS interface engine 315 can instruct the host system to reboot or to hibernate.

In the example of FIG. 3, the virtualization environment management engine 320 is coupled to the computer-readable medium 305. In various implementations, the virtualization environment management engine 320 includes resources (e.g., processor resources, memory resources, and network resources) used to support the virtualization environment. In an implementation, the virtualization environment management engine 320 interfaces with a network interface of the host system.

In the example of FIG. 3, the virtual machine management engine 325 is coupled to the computer-readable medium 305. In an implementation, the virtual machine management engine 325 includes processes that manage the resources used to support virtual machine instances in the virtualization environment. The virtual machine management engine 325 can interface with a network interface of the host system.

In the example of FIG. 3, the virtual machine state data transfer engine 330 is coupled to the computer-readable medium 305. In a specific implementation, the virtual machine state data transfer engine 330 includes resources (e.g., processor resources, memory resources, and network resources) used to maintain a state of the virtualization environment and/or the one or more virtual machine instances maintained in the virtualization environment. In some implementations, the virtual machine state data transfer engine 330 maintains a delta file of the state of the virtualization environment and/or the one or more virtual machine instances maintained in the virtualization environment. The virtual machine state data transfer engine 330 can interface with the network interface of the host system. In an implementation, the virtual machine state data transfer engine 330 provides state data to the main operating system of the host system.

In the example of FIG. 3, the delayed virtual machine data uploading engine 335 is coupled to the computer-readable medium 305. In an implementation, the delayed virtual machine data uploading engine 335 maintains an uploading process on the main operating system. The uploading process can access the delta file that has stored thereon the state of the virtualization environment and/or the one or more virtual machine instances maintained in the virtualization environment. In some implementations, the delayed virtual machine data uploading engine 335 provides at least portions of the delta file to the network interface of the host system.

In the example of FIG. 3, the virtualization environment security engine 340 is coupled to the computer-readable medium 305. In a specific implementation, the virtualization environment security engine 340 supports security associated with the virtualization environment. The virtualization environment security engine 340 can incorporate security and/or other protocols to ensure portions of the host system outside the virtualization environment do not have access to data related to the virtual machine instances in the virtualization environment. The virtualization environment security engine 340 can be linked to hardware security (e.g., a secure chip) on the host system that is used to maintain the security of the host system.

In an implementation, the virtualization environment engine in the diagram 300 operates to maintain a virtualization environment and/or virtual machine instances thereon. The virtualization environment can provide virtualized resources to support the virtual machine instances. Moreover, the virtualization environment installation engine 310 can operate register install the virtualization environment on the operating system of the host system. The virtualization environment installation engine 310 can also install at least portions of the virtualized compute operating system on a host system 105. For example, the virtualization environment installation engine 310 can support an installer image that facilitates installation of the virtualization environment on the host system 105. The virtualization environment installation engine 310 can be controlled locally on the host system 105 or through controls from the virtualized compute control and management system 130, in various implementations. Any installation can require the main operating system of the host system 105 to reboot. In various implementations, the virtualization environment installation engine 310 also provides the host system with uninstallation sequences that remove the virtualization environment.

In some implementations, the main OS interface engine 315 operates to interface with the main operating system of the host system. The main OS interface engine 315 can allow the host system 105 to reboot and to enter into the virtualization environment. The main OS interface engine 315 can also allow the host system 105 to hibernate and enter into the virtualization environment. Where the virtualization environment is implemented as a minimalist hypervisor, no reboot or hibernate can be required. The main OS interface engine 315 can also receive commands from the user of the host system 105 and/or otherwise interface with the user of the host system 105. In various implementations, the main OS interface engine 315 maintains data structures in a manner that appear transparent to the file structure of the main operating system of the host system 105. The main OS interface engine 315 can further make it appear like the virtualization environment is an application that is installed on the file system of the host system 105. The main OS interface engine 315 can also close processes, clear memory, etc., when the virtualization environment is exiting and the main operating system is being rebooted. In an implementation, the main OS interface engine 315 facilitates installation and/or updates of the virtualization environment engine 110 and/or virtualization environments supported therein.

In a specific implementation, the virtualization environment management engine 320 operates to initialize the virtualization environment of the virtualization environment engine. More specifically, the virtualization environment management engine 320 can receive virtual machine instances from the network. The virtualization environment management engine 320 can also load virtual machine instances into memory of the host system 105. The virtualization environment management engine 320 can also close processes, clear memory, etc. when virtual memory instances are terminated.

In various implementations, the virtual machine management engine 325 operates to manage virtual machine instances in the virtualization environment. The virtual machine management engine 325 can facilitate selection of a tier of virtual machine to run on the host system. The virtual machine management engine 325 can further support aspects of virtual operating systems, virtual resources, virtual applications, virtual network connections, and security functions associated with virtual machine instances in the virtualization environment. The virtual machine management engine 325 can also close processes, clear memory, etc. when virtual memory instances are terminated.

In some implementations, the virtual machine state data transfer engine 330 operates to store the state of virtual machine instances in a delta disk. The virtual machine state data transfer engine 330 can, in some implementations, ensure that changes in the state of virtual machine instances are provided upon exit of the virtualization environment. The virtual machine state data transfer engine 330 can also support security and other functions related to the state of virtual machine instances in the virtualization environment.

In a specific implementation, the delayed virtual machine data uploading engine 335 operates to transfer data (e.g., state and/or change of state data) associated with virtual machine instances. In various implementations, the delayed virtual machine data uploading engine 335 provides a change of state after exit of the virtualization environment and after entry into the main operating system of the host system 105. More specifically, in these implementations, the delayed virtual machine data uploading engine 335 can upload state data as a secure process running in the background of the main operating system of the host system 105.

Figure 4:
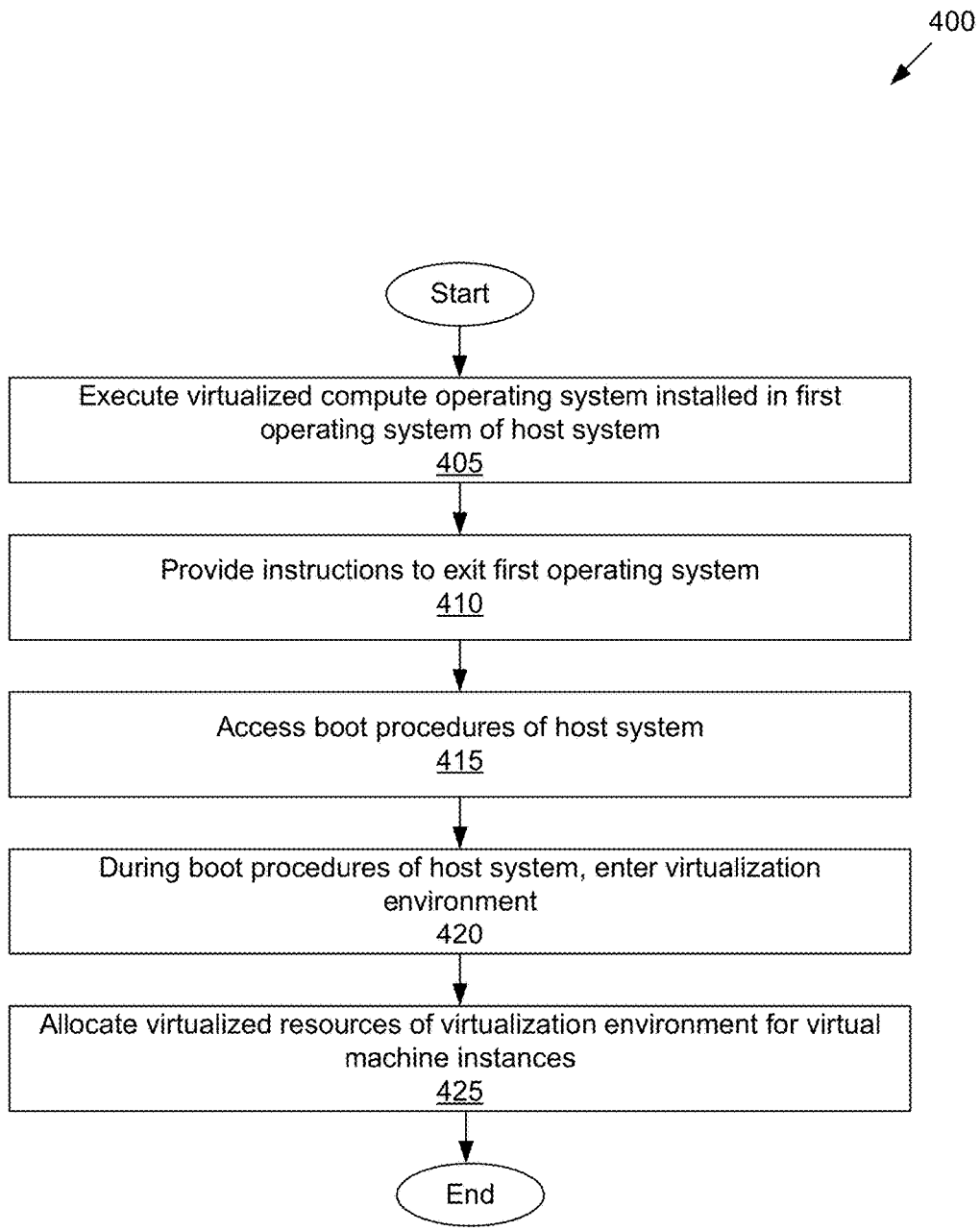
FIG. 4 depicts a flowchart of an example of a method for initializing a virtualization environment engine.

FIG. 4 depicts a flowchart 400 of an example of a method for initializing a virtualization environment engine. One or more of the blocks of the flowchart 400 can be implemented using the virtualization environment engine 110, shown in FIG. 1, and/or the virtualization environment engine, shown in the diagram 300 in FIG. 3.

At block 405, a virtualized compute operating system installation application is executed in a first operating system of a host system. In a specific implementation, the virtualization environment installation engine 310 executes an installation file that is executed in the main operating system of the host system. For example, in implementations using Microsoft Windows, the virtualization environment installation engine 310 provides a Microsoft Installer (MSI) file and/or COM objects. The MSI file and/or COM objects can facilitate installation of the a virtualization environment on the host system. The virtualization environment can appear to the EFI of the host system as a distinct operating system. The virtualization environment can also appear to disk partitioning and/or disk layout software on the host system as a file system that is compatible with the main operating system of the host system.

At block 410, instructions are provided to exit the first operating system. In some implementations, the main OS interface engine 315 instructs the main operating system of the host system to exit. For example, the main OS interface engine 315 can call routines in the main operating system to close applications and clear processes managed by the main operating system. In some implementations, the instructions instruct the main operating system to shut down and reboot, while in other implementations, the instructions instruct the main operating system to hibernate.

At block 415, boot procedures of the host system are accessed. In an implementation, the main OS interface engine 315 accesses boot processes of the host system. The main OS interface engine 315 can, for example, access BIOS procedures of the host system.

At block 420, during boot procedures of host system, a virtualization environment is entered. In various implementations, the virtualization environment management engine 320 allocates resources for the virtualization environment to be entered. The virtualization environment management engine 320 can further load the virtualization environment into memory of the host system. In various implementations, the host system executes processes related to the virtualization environment. The virtualization environment can virtualize resources of the host system to provide virtualized resources that can be used by virtual machine instances.

At block 425, virtualized resources of the virtualization environment are allocated for virtual machine instances. In an implementation, the virtualization environment management engine 320 allocates virtualized resources of the virtualization environment for virtual machine instances that are to be supported by the virtualization environment.

Figure 5:
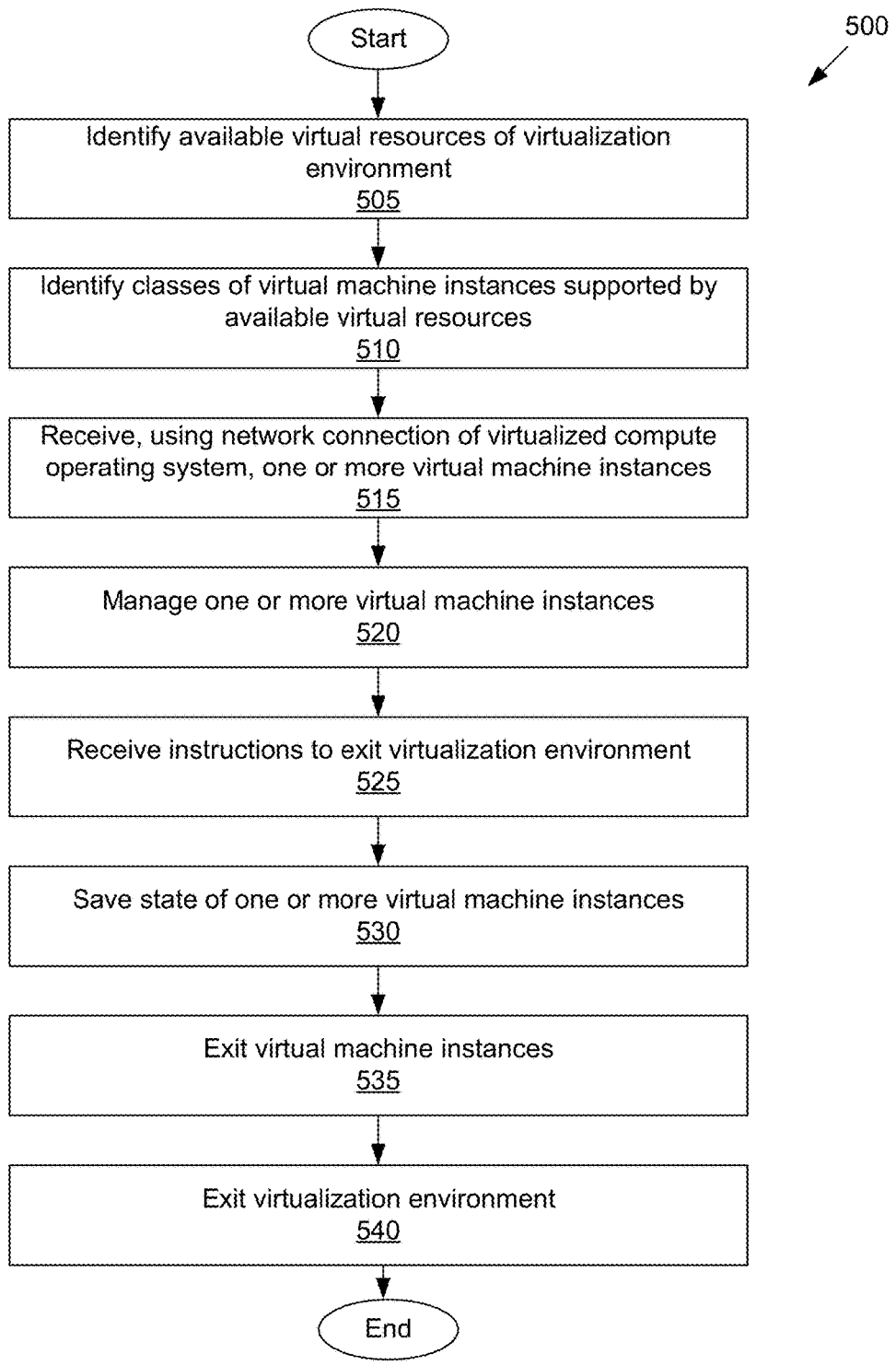
FIG. 5 depicts a flowchart of an example of a method for managing one or more virtual machine instances in a virtualization environment.

FIG. 5 depicts a flowchart 500 of an example of a method for managing one or more virtual machines in a virtualization environment. One or more of the blocks of the flowchart 500 can be implemented using the virtualization environment engine 110, shown in FIG. 1, and/or the virtualization environment engine, shown in the diagram 300 in FIG. 3.

At block 505, available virtual resources of virtualization environment are identified. In an implementation, the virtual machine management engine 325 identifies available virtual resources of the virtualization environment on the host system. The virtual machine management engine 325 can determine how many virtual machine instances can be supported by the virtualization environment.

At block 510, classes of virtual machine instances supported by the available virtual resources are identified. In an implementation, virtual machine management engine 325 determines the classes of virtual machine supported by the virtual machine environment. For example, the virtual machine management engine 325 can identify whether the host system is configured to support more secure tiers of virtual machines, or whether the host system is configured to support only less secure tiers of virtual machines.

At block 515, one or more virtual machine instances are received using a network connection of the virtualized compute operating system. In a specific implementation, the network interface of the virtualization environment engine can receive virtual machine instances over a network connection. The virtual machine instances can be compatible with the available virtual resources of the virtualization environment. The virtual machine instances can also be compatible with the classes of virtual machine instances supported by the available virtual resources. For example, if the virtualization environment supports more secure classes of virtual machine instances, the network interface of the virtualization environment engine can receive these more secure classes of virtual machine instances. Similarly, if the virtualization environment supports less secure classes of virtual machine instances, the network interface of the virtualization environment engine can receive these less secure classes of virtual machine instances.

At block 520, the one or more virtual machine instances are managed. In an implementation, the virtual machine management engine 325 manages the one or more virtual machine instances. In an implementation, the virtual machine management engine 325 receives instructions to further manage the virtual machine instances from the virtualized compute control and management system 130, shown in FIG. 1.

At block 525, instructions to exit the virtualization environment are received. In various implementations, the virtualization environment engine can internally generate instructions to exit the virtualization environment are received and/or can receive instructions to exit the virtualization environment are received from an external source. In some implementations, the virtualization environment management engine 320 identifies that the virtualization environment needs to be exited or restarted. Or, in some implementations, the virtualization environment engine receives an external notification that the host system is about to be powered off, that a user of the host system is to restart the host system, or that the main operating system of the host system is to be rebooted.

At block 530, the state of the one or more virtual machine instances are saved. In an implementation, the virtual machine state data transfer engine 330 saves the state of the virtual machine instances. In an implementation, the state of the virtual machine instances is saved in a delta disk that comprises a difference in state of the virtual machine instances from the last time the virtual machine instances were in use. The delta disk can be uploaded using delayed uploading processes as described in this paper.

At block 535, the virtual machine instances are exited. In an implementation, the virtual machine management engine 325 clears the virtual machine instances from the virtualized resources of the virtualization environment. More specifically, the virtual machine management engine 325 can clear the virtual machine instances from virtual memory, stop all virtual processes related to the virtual machine instances, terminate virtual network connections of the virtual machine instances, etc.

At block 540, the virtualization environment is exited. In an implementation, the virtualization environment management engine 320 instructs the virtualization environment to exit. The virtualization environment management engine 320 can further provide the main OS interface engine 315 to reboot the host system so that, e.g., the main operating system is restarted, or that other procedures are followed.

Figure 6:
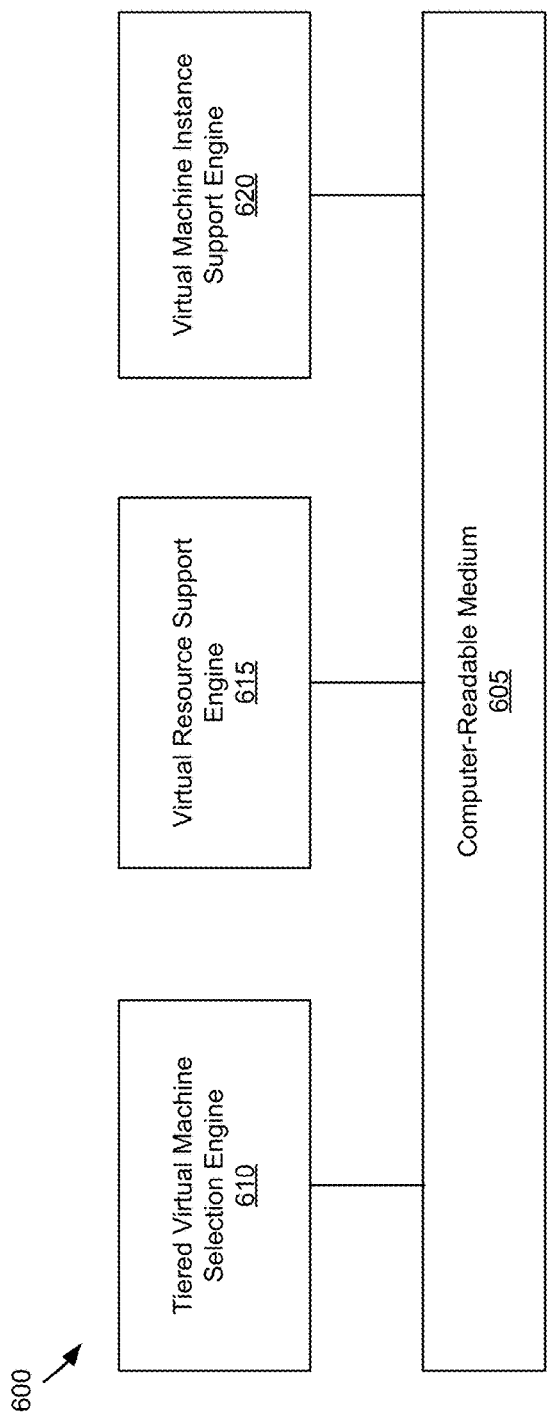
FIG. 6 depicts a diagram illustrating an example of a virtual machine management engine.

FIG. 6 depicts a diagram 600 illustrating an example of a virtual machine management engine. The virtual machine management engine can correspond, in implementations, to the virtual machine management engine 325 shown in FIG. 3. In the example of FIG. 6, the virtual machine management engine includes a computer-readable medium 605, a tiered virtual machine selection engine 610, virtual resource support engine 615, and a virtual machine instance support engine 620. In implementations, the computer-readable medium 605 can include a "computer-readable medium," as described in this paper. In various implementations, one or more of the tiered virtual machine selection engine 610, the virtual resource support engine 615, and the virtual machine instance support engine 620 can include an "engine," as discussed in this paper.

In the example of FIG. 6, the tiered virtual machine selection engine 610 is coupled to the computer-readable medium 605. In a specific implementation, the tiered virtual machine selection engine 610 maintains a datastore having virtual machine tiers stored thereon. The tiered virtual machine selection engine 610 can also include engines to provide a user interface (e.g., a GUI) to facilitate selection of virtual machine tiers.

In the example of FIG. 6, the virtual resource support engine 615 is coupled to the computer-readable medium 605. In a specific implementation, the virtual resource support engine 615 supports virtual resources of virtual machines in the virtualization environment. For example, the virtual resource support engine 615 can maintain a datastore of virtual processor allocations, virtual memory allocations, virtual storage allocations, and/or virtual network resource allocations. The virtual resource support engine 615 can further provide information from this datastore to other engines of the virtual machine management engine.

In the example of FIG. 6, the virtual machine instance support engine 620 is coupled to the computer-readable medium 605. In various implementations, the virtual machine instance support engine 620 supports virtual machine instances. The virtual machine instance support engine 620 can maintain a datastore of the resources required for specific virtual machine instances. The virtual machine instance support engine 620 can also obtain available resources from the virtual resource support engine 615.

In various implementations, the tiered virtual machine selection engine 610 operates to support selection of one or more virtual machine tiers. Virtual resources made available by a host system can be grouped into different virtual machine tiers based on the amount of virtual processor, virtual memory, virtual network, and other virtual resources that are supported. The tiered virtual machine selection engine 610 can provide one or more virtual machine tiers are supported. Virtual machine tiers can be based on, in various implementations, geography, legal jurisdictions, import and/or export control laws and/or permissions, available network resources of host system(s), proximity to other virtualization environment engines, security, bandwidth, predicted network throttling, carriers, positioning near a marketing target, proximity by network hops, current cost of power on a utilized grid, and other factors. The tiered virtual machine selection engine 610 can receive selection of computing tier(s) from the virtualized compute control and management system 130. The selection can be in response to requests from the virtualized compute client engine 125.

The virtual machine instance support engine 620 can operate to load particular virtual machine instances into the virtualization environment. In some implementations, the virtual machine instance support engine 620 receives parameters of the specific virtual machine instances from a virtualized compute control and management system through a network connection. The virtual machine instance support engine 620 can configure particular virtual machine instances in accordance with the parameters that are received. The virtual machine instance support engine 620 can allocate specific virtual resources for these virtual machine instances. For example, the virtual machine instance support engine 620 can allocate virtual processors, virtual memory, virtual network connections, etc. for these virtual machine instances. The virtual machine instance support engine 620 can also manage allocated virtual resources and can clean up virtual machine instances. For instance, the virtual machine instance support engine 620 can end processes associated with virtual machine instances, can clear memory associated with virtual machine instances, and can disconnect virtual machine instances from virtual network connections.

Figure 7:
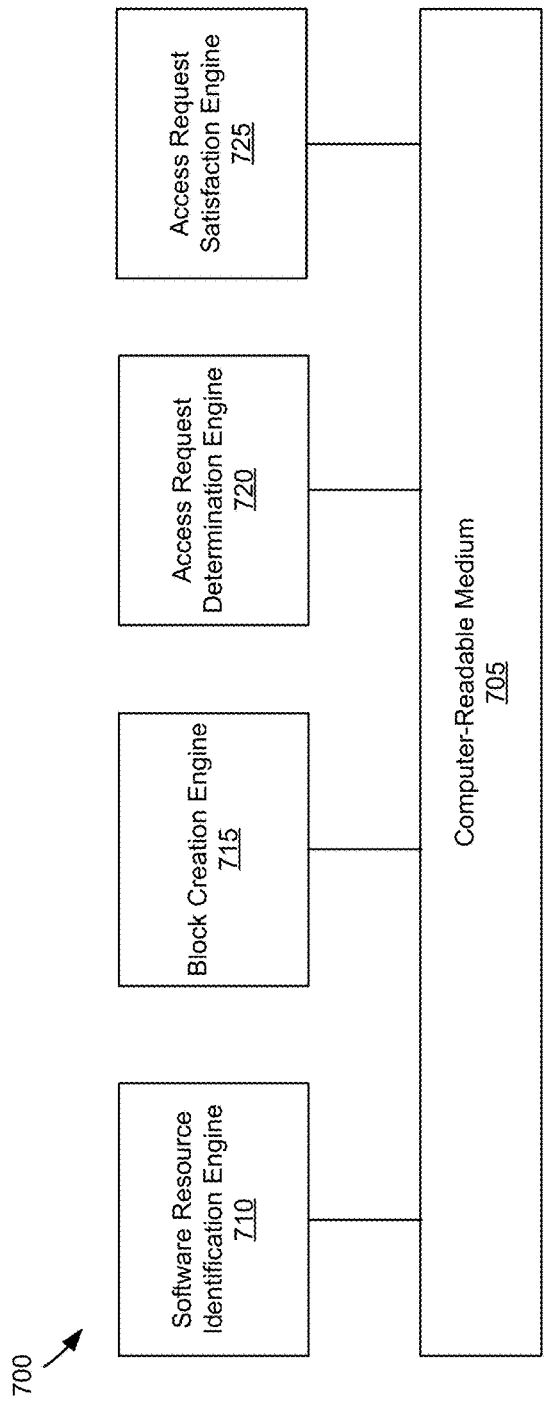
FIG. 7 depicts a diagram illustrating an example of a secure disk activity support engine.

FIG. 7 depicts a diagram 700 of a virtualization environment security engine. In an implementation, the virtualization environment security engine corresponds to the virtualization environment security engine 340, shown in FIG. 3. The virtualization environment security engine includes a computer-readable medium 705, a software resource identification engine 710, a block creation engine 715, an access request determination engine 720, and an access request satisfaction engine 725. The computer-readable medium 705 can include a "computer-readable medium," as described in this paper. One or more of the software resource identification engine 710, the block creation engine 715, the access request determination engine 720, and the access request satisfaction engine 725 can include an "engine," as discussed in this paper.

In the example of FIG. 7, the software resource identification engine 710 is coupled to the computer-readable medium 705. In a specific implementation, the software resource identification engine 710 includes interfaces that send and receive data to and from portions of the main operating system of the host system. The software resource identification engine 710 can interface with, for instance, the main operating system's registry and/or with the portions of the main operating system that identify specific software resources related to the host system. In an implementation, the software resource identification engine 710 interfaces with file systems of the main operating system. For example, the software resource identification engine 710 can identify specific files used by one or more programs of the host system. The software resource identification engine 710 can identify specific files used by a virtualization environment of the host system.

In the example of FIG. 7, the block creation engine 715 is coupled to the computer-readable medium 705. In a specific implementation, the block creation engine 715 uses tables, datastores, etc. to look up hardware resources of the host system corresponding to identified software resources of the virtualization environment. As an example, the block creation engine 715 can identify the portions of a hard disk (e.g., specific Small Computer System Interface (SCSI) blocks) of the host system that correspond to specific files of the host system used by the virtualization environment. As another example, the block creation engine 715 can identify portions of memory or a secure chip that correspond to specific files of the host system used by the virtualization environment. The block creation engine 715 can further create blocks to emulate these hardware resources. For example, the block creation engine 715 can create blocks of streaming software that correspond to the identified hardware resources. The block creation engine 715 can be implemented as a driver or a virtualized driver (e.g., a Linux® driver) that runs in the virtualization environment. The block creation engine 715 can provide identified blocks to the other modules of the virtualization environment security engine.

In the example of FIG. 7, the access request determination engine 720 is coupled to the computer-readable medium 705. In a specific implementation, the access request determination engine 720 includes a traffic monitor and/or a data monitor to identify requests to access software resources of the host system. For instance, the access request determination engine 720 can identify whether there are attempted reads or write requests to NT file system files used by the virtualization environment. The access request determination engine 720 can provide the names of specific software resources being accessed to the access request satisfaction engine 725 and/or to the other modules of the virtualization environment security engine.

In the example of FIG. 7, the access request satisfaction engine 725 is coupled to the computer-readable medium 705. The access request satisfaction engine 725 can associate requests to access software resources of the host system with blocks of streaming software created to emulate hardware resources of the host system. In an implementation, the access request satisfaction engine 725

In the example of FIG. 7, the access request satisfaction engine 725 is coupled to the computer-readable medium 705. In a specific implementation, the access request satisfaction engine 725 satisfies the access requests using the blocks. The access request satisfaction engine 725 can include streaming software that streams the blocks embodied in a driver or pseudo-driver to virtual machine instances in the virtualization environment. More specifically, the access request satisfaction engine 725 can identify specific blocks of streaming software corresponding to software resources of the virtualization environment. The access request satisfaction engine 725 can correlate the specific blocks with access requests related to the software resources.

In various implementations, the virtualization environment security engine operates to identify requests for software resources of the virtualization environment, correlate these requests with hardware resources of the host system, and create blocks of streaming software for these requests. The virtualization environment security engine can also fulfill the requests for software resources with specific blocks of streaming software. More specifically, in an implementation, the software resource identification engine 710 operates to identify requests for software resources associated with the virtualization environment. For example, the software resource identification engine 710 can receive requests for specific files, processes, or applications used by the virtualization environment.

Moreover, in an implementation, the block creation engine 715 identifies specific hardware resources of the host system that correspond to the identified software resources. As an example, the block creation engine 715 can identify specific portions of disk or memory that are used to implement the specific files, processes, or applications being requested. In some implementations, the access request determination engine 720 receives requests to access virtualized resources in the virtualization environment. For example, the access request determination engine 720 can receive requests to access virtual processors, virtual memory, virtual disk, and/or virtual network resources. The access request satisfaction engine 725 can operate to satisfy these requests for virtual resources with blocks created by the block creation engine 715.

Figure 8:
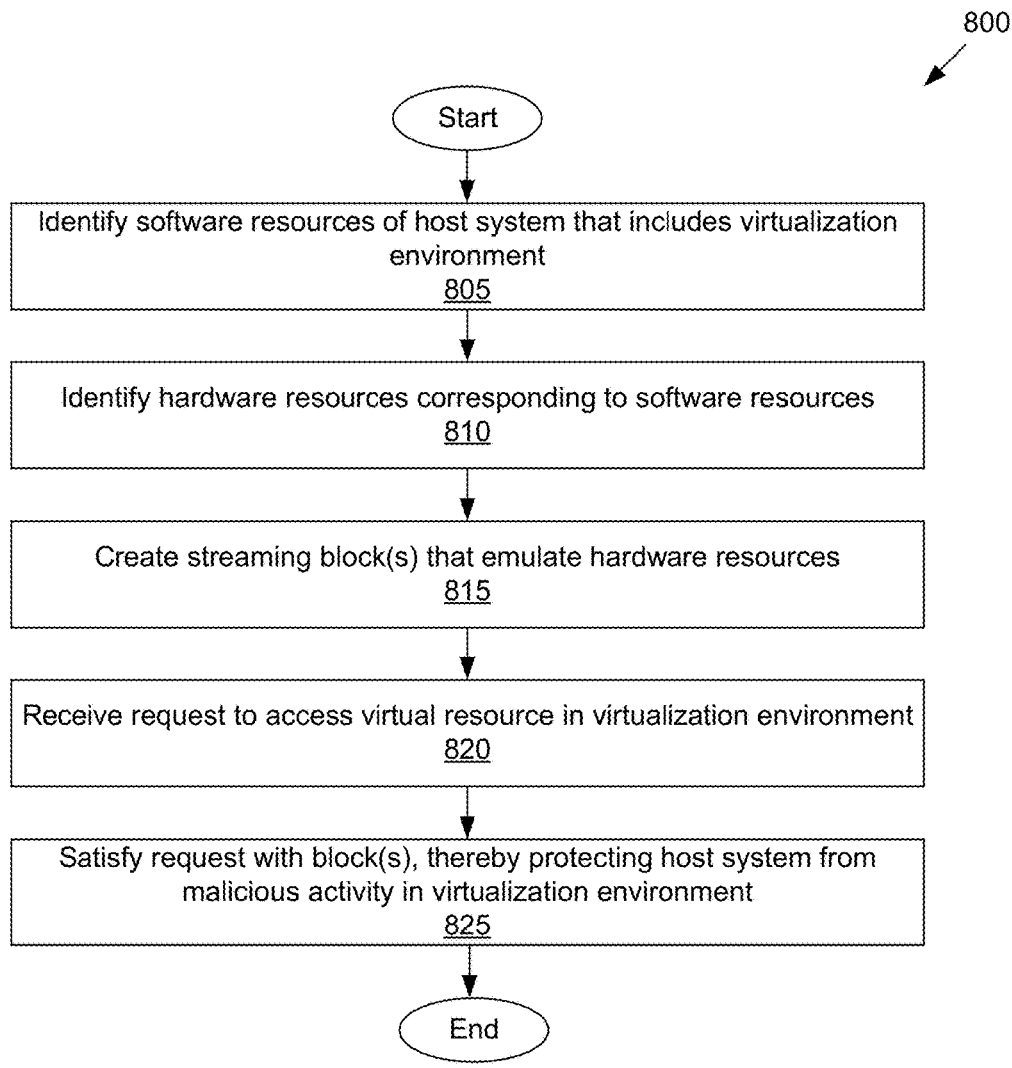
FIG. 8 depicts a flowchart of an example of a method for securely accessing nested files.

FIG. 8 depicts a flowchart 800 of an example of a method for securely accessing nested files. One or more of the blocks of the flowchart 800 can be implemented using the virtualization environment engine, shown in the diagram 700 in FIG. 7.

At block 805, software resources of a host system that includes a virtualization environment are identified. In an implementation, the software resource identification engine 710 identifies software resources of a host system that includes a virtualization environment. For example, the software resource identification engine 710 can identify files and other software resources of a host system to be used by a virtualization environment executed on that host system.

At block 810, hardware resources corresponding to the software resources are identified. In an implementation, the block creation engine 715 identifies specific portions of a hard disk, specific portions of memory, and/or other hardware resources that correspond to the software resources that were identified. At block 815, streaming blocks that emulate the hardware resources are created. More specifically, the block creation engine 715 can emulate the hardware resources using a set of blocks that can be streamed from the block creation engine 715.

At block 820, a request to access a virtual resource in a virtualization environment is received. In an implementation, the access request determination engine 720 receives one or more requests to access the virtual resources of the virtualization environment. The access request determination engine 720 can receive a request to access virtual memory, processor(s), network resources, etc.

At block 825, the request is satisfied with the blocks. The access request satisfaction engine 725 can stream to the requester blocks that correspond to the request for the software resource. The blocks can be used to satisfy the request for the software resource. In various implementations, satisfying the request with the block protects the host system from malicious activity in the virtualization environment. More specifically, the virtualization environment security engine can allow requests for virtual resources to be satisfied without requiring direct access to files, processes, or applications outside the virtualization environment. Further, the virtualization environment security engine need not allow processes within the virtualization environment to have access to drivers or the file system (e.g., the NT file system) of the host system. Rather, the virtualization environment security engine can satisfy requests for resources of the host system using streaming blocks that allow insulation from malicious code and/or malicious processes.

In an implementation, the access request satisfaction engine 725 satisfies the access requests with the specific blocks of streaming software.

Figure 9:
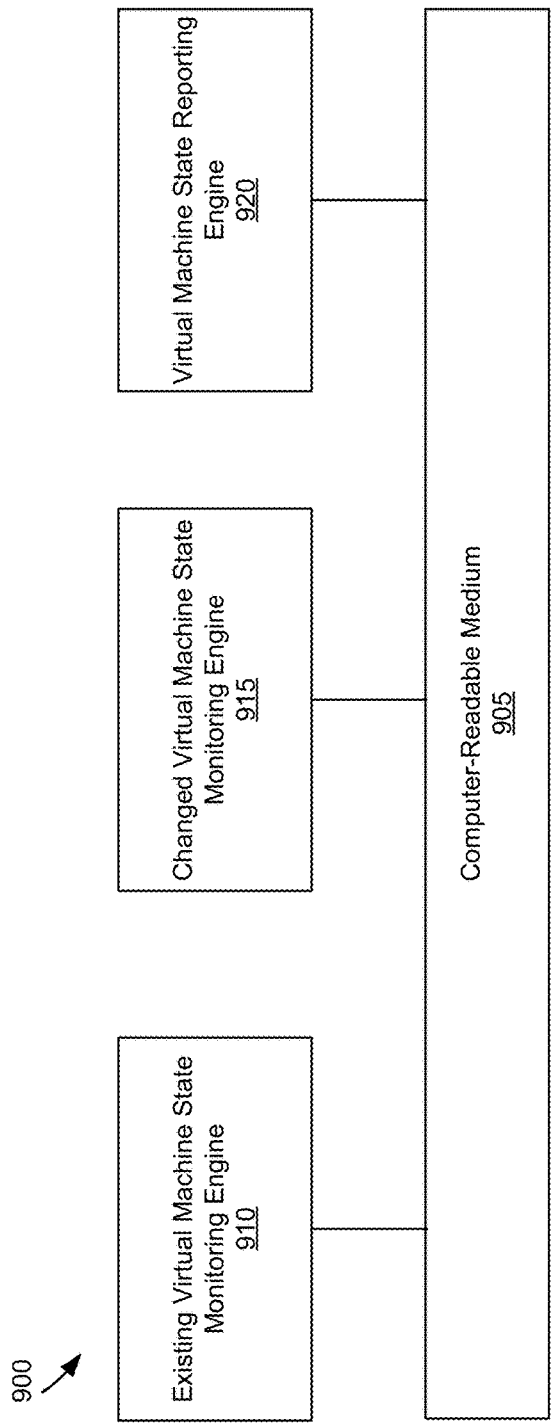
FIG. 9 depicts a diagram illustrating an example of a virtual machine state data transfer engine.

FIG. 9 depicts a diagram 900 illustrating an example of a virtual machine state data transfer engine. The virtual machine state data transfer engine can correspond, in various implementations, to the virtual machine state data transfer engine 330, shown in FIG. 3 and discussed further in this paper. Returning to the example of FIG. 9, the virtual machine state data transfer engine can include a computer-readable medium 905, an existing virtual machine state monitoring engine 910, a changed virtual machine state monitoring engine 915, and a virtual machine state reporting engine 920. The computer-readable medium 905 can comprise a "computer-readable medium," as discussed in this paper. One or more of the existing virtual machine state monitoring engine 910, the changed virtual machine state monitoring engine 915, and the virtual machine state reporting engine 920 can include an "engine," as discussed in this paper.

In the example of FIG. 9, the existing virtual machine state monitoring engine 910 is coupled to the computer-readable medium 905. In an implementation, the existing virtual machine state monitoring engine 910 identifies states of a virtualization environment and of virtual machine instances executing in the virtualization environment. The existing virtual machine state monitoring engine 910 can identify states of virtual processors, virtual memory, and virtual network resources associated with the virtualization environment. The existing virtual machine state monitoring engine 910 can also identify states associated with users and/or clients accessing the virtualization environment and/or virtual machine instances. For example, the existing virtual machine state monitoring engine 910 can identify specific users, specific devices, and/or specific applications used to access the virtualization environment and/or the virtual machine instances on the virtualization environment. In some implementations, the existing virtual machine state monitoring engine 910 identifies properties of a base disk on which states of the virtualization environment and virtual machine instances executing in the virtualization environment are stored.

In the example of FIG. 9, the changed virtual machine state monitoring engine 915 is coupled to the computer-readable medium 905. In implementations, the changed virtual machine state monitoring engine 915 can maintain a change in state of the virtualization environment and/or the virtual machine instances. The changed virtual machine state monitoring engine 915 can store a delta disk image that has a change in state of the virtualization environment and/or the virtual machine instances.

In the example of FIG. 9, the virtual machine state reporting engine 920 is coupled to the computer-readable medium 905. In a specific implementation, the virtual machine state reporting engine 920 receives existing and/or changed states of the virtualization environment and/or virtual machine instances. The virtual machine state reporting engine 920 can also provide a report that includes existing and/or changed states of the virtualization environment and/or virtual machine instances. The report can have a known or convenient format. In an implementation, the virtual machine state reporting engine 920 provides the delta disk to other devices.

In a specific implementation, the virtual machine state data transfer engine operates to report when states of the virtualization environment and/or virtual machine instances executing in the virtualization environment change. More specifically, the existing virtual machine state monitoring engine 910 can store a base disk image that has an existing state of the virtualization environment and/or the virtual machine instances. In various implementations, the base disk image can be unencrypted or have a lower level of security than a corresponding delta disk image. In some implementations, the base disk can be distributed across other devices (including one or more devices associated with the virtualized compute control and management system 130, shown in FIG. 1). In some implementations, the existing virtual machine state monitoring engine 910 provides access to a distributed base disk. In various implementations, the existing virtual machine state monitoring engine 910 can ensure no interesting information is stored on the base disk image. It is noted that the base disk and the delta disk need not be encrypted at all in various implementations.

Moreover, the changed virtual machine state monitoring engine 915 can operate to ensure only interesting information is on the delta disk image, and that the delta disk image is encrypted or has a higher level of security than a base disk image. In various implementations, the changed virtual machine state monitoring engine 915 can ensure any key to the delta disk image is destroyed if the delta disk image becomes compromised. The virtual machine state reporting engine 920 an operate to report the state of the virtualization environment and/or the virtual machine instances. The virtual machine state reporting engine 920 can also operate to provide attributes of base and/or delta disk images. In an implementation, the existing virtual machine state monitoring engine 910 can receive the delta disk and can restore the state of the virtualization environment and/or the virtual machine instances based a comparison of the delta disk and the base disk.

Figure 10:
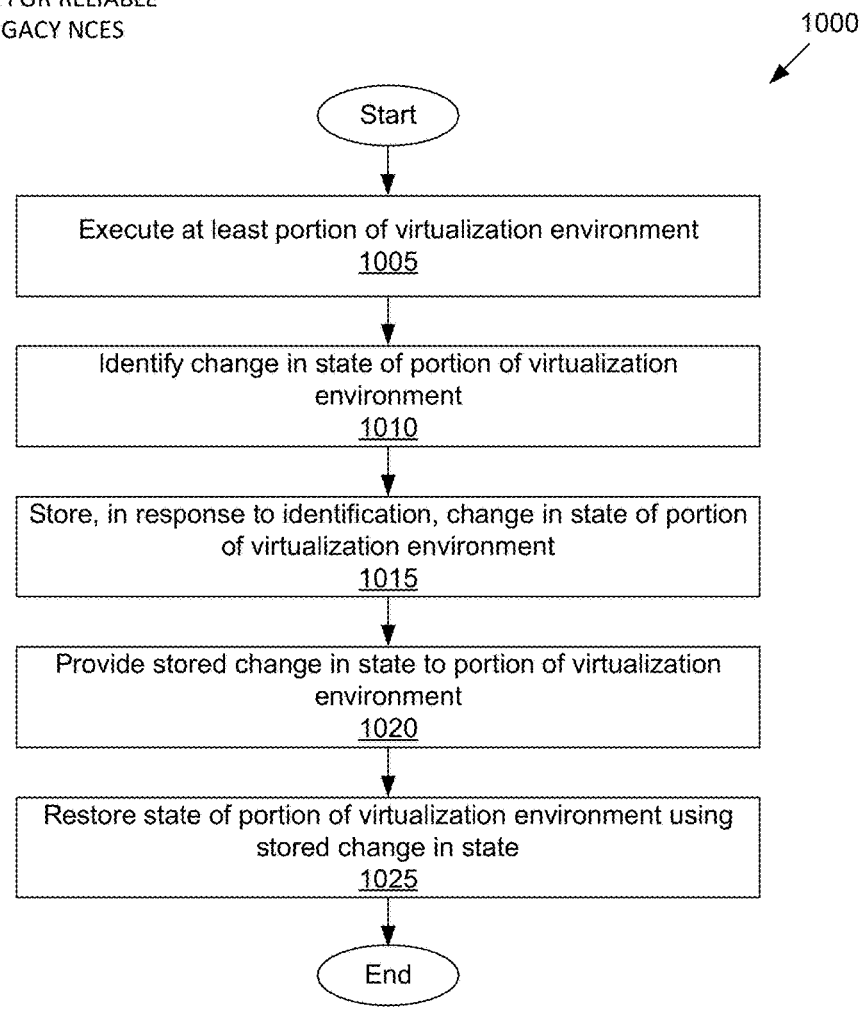
FIG. 10 depicts a flowchart of an example of a method for managing state in a virtualization environment engine.

FIG. 10 depicts a flowchart 1000 of an example of a method for managing state in a virtualization environment engine. One or more of the blocks of the flowchart 1000 can be implemented using the virtual machine state data transfer engine shown in the diagram 900 in FIG. 9.

At block 1005, at least portion of a virtualization environment is executed. In an implementation, the virtualization environment can be executed in a host system. Virtual machine instances can be executed within the virtualization environment. The existing virtual machine state monitoring engine 910 can further monitor and store the state of the virtualization environment and/or the virtual machine instances in a base disk.

At block 1010, a change in the state of the portion of the virtualization environment is identified. In an implementation, the changed virtual machine state monitoring engine 915 identifies changes in state of the virtualization environment and/or the virtual machine instances. At block 1015, the change in state of the portion of the virtualization environment is stored in response to the identification.

At block 1020, the stored change in state to the virtualized compute control and management system is provided. More specifically, in an implementation, the virtual machine state reporting engine 920 can report the change in state of the portion of the virtualization environment or can provide the delta disk to another device. At block 1025, the state of the portion of the virtualization environment is restored using the stored change in state. In an implementation, the existing virtual machine state monitoring engine 910 restores the state of the portion of the virtualization environment based on the information from the delta disk.

Figure 11:
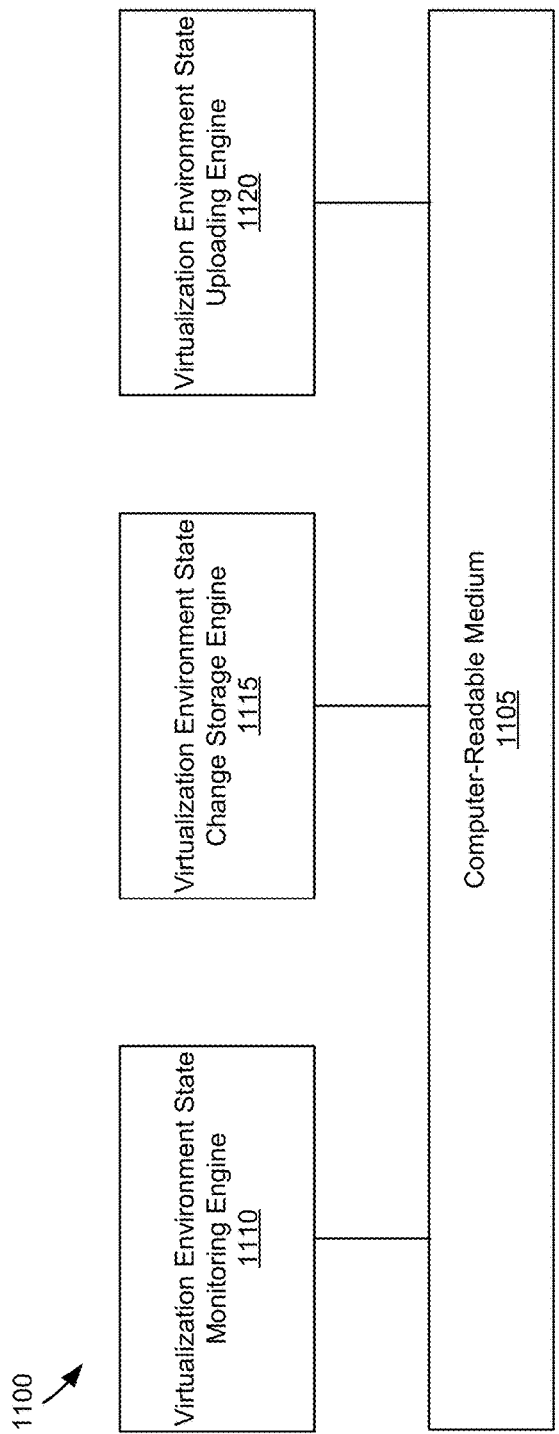
FIG. 11 depicts a diagram illustrating an example of a delayed virtual machine data uploading engine.

FIG. 11 depicts a diagram 1100 illustrating an example of a delayed virtual machine data uploading engine. The delayed virtual machine data uploading engine in the diagram 1100 can correspond, in various implementations, to the delayed virtual machine data uploading engine 335, shown in FIG. 3. Returning to the example of FIG. 11, the delayed virtual machine data uploading engine includes a computer-readable medium 1105, a virtualization environment state monitoring engine 1110, a virtualization environment state change storage engine 1115, and a virtualization environment state uploading engine 1120. The computer-readable medium 1105 can comprise a "computer-readable medium," as discussed in this paper. One or more of the virtualization environment state monitoring engine 1110, the virtualization environment state change storage engine 1115, and the virtualization environment state uploading engine 1120 can include an "engine," as discussed in this paper.

In the example of FIG. 11, the virtualization environment state monitoring engine 1110 is coupled to the computer-readable medium 1105. In a specific implementation, the virtualization environment state monitoring engine 1110 includes processes on the host system that monitor the state of virtualized resources in the virtualization environment. The virtualization environment state monitoring engine 1110 can also monitor the state of virtual machine instances in the virtualization environment. In an implementation, the virtualization environment state monitoring engine 1110 can provide changes in the state of the virtualization environment and/or virtual machine instances thereon to other modules.

In the example of FIG. 11, the virtualization environment state change storage engine 1115 is coupled to the computer-readable medium 1105. In an implementation, the virtualization environment state change storage engine 1115 can store specific changes in state to the virtualization environment and/or virtual machine instances executed thereon. For example, the virtualization environment state change storage engine 1115 can store how virtualized resources, virtualized processes, virtualized applications, etc. have changed in relation to a base disk. In some implementation, the virtualization environment state change storage engine 1115 manages a delta disk that stores changes in the state of the virtualization environment and/or virtual machine instances executed in the virtualization environment. The delta disk can be encrypted or otherwise secured from unauthorized access. For example, in an implementation, at least portions of the delta disk are stored on secure hardware (e.g., a secure chip) that uses encryption or other security protocols.

In the example of FIG. 11, the virtualization environment state uploading engine 1120 is coupled to the computer-readable medium 1105. In various implementations, the virtualization environment state uploading engine 1120 manages processes on a main operating system of a host device that upload a delta disk to a networked resource. For example, the virtualization environment state uploading engine 1120 can create processes in the main operating system that have network access. The virtualization environment state uploading engine 1120 can also use these processes to upload at least portions of the delta disk to a networked location. The virtualization environment state uploading engine 1120 can upload the delta disk to a virtualized compute control and management system (e.g., to the virtualized compute control and management system 130 through the network 115 shown in FIG. 1), or to another virtualization environment (e.g., to one of the virtualization environment engines 110 through the virtual/logical network 135 shown in FIG. 1).

In a specific implementation, the delayed virtual machine data uploading engine operates to upload changes to the state of the virtualization environment and/or states of virtual machine instances executed in the virtualization environment using a main operating system of a host system. The virtualization environment state monitoring engine 1110 can monitor changes to states of the virtualization environment, and changes to virtual machine instances. The virtualization environment state change storage engine 1115 can store these state changes in a delta disk on the host device. Moreover, in an implementation, once the virtualization environment has exited, the main operating system of the host system can load. The virtualization environment state uploading engine 1120 can create one or more processes in the main operating system to upload the delta disk to a networked resource. For example, the virtualization environment state uploading engine 1120 can upload the delta disk to one or more of a virtualized compute control and management system and another virtualization environment.

Figure 12:
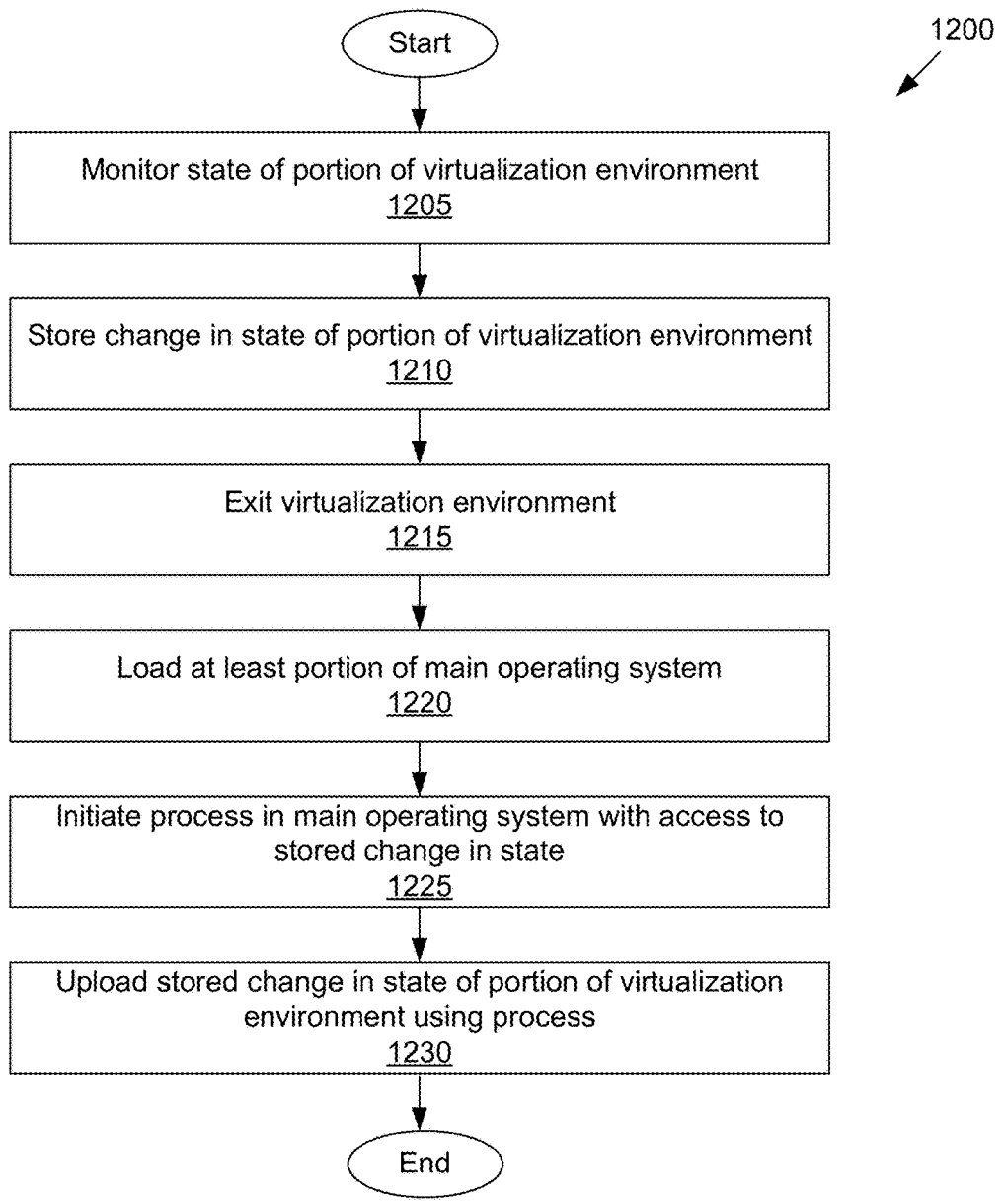
FIG. 12 depicts a flowchart of an example of a method for uploading data from a virtualization environment engine.

FIG. 12 depicts a flowchart 1200 of an example of a method for uploading data from a virtualization environment engine. One or more of the blocks of the flowchart 1200 can be implemented using the delayed virtual machine uploading engine shown in the diagram 1100 in FIG. 11.

At block 1205, a state of at least a portion of a virtualization environment is monitored. In a specific implementation, the virtualization environment state monitoring engine 1110 monitors at least a portion a virtualization environment. More specifically, the virtualization environment state monitoring engine 1110 can monitor the virtualization environment itself and/or virtual machine instances executed in the virtualization environment.

At block 1210, a change in the state of the portion of the virtualization environment is stored. In an implementation, the virtualization environment state change storage engine 1115 stores changes to the virtualization environment and/or the virtual machine instances to a delta disk. The delta disk may or may not be encrypted.

At block 1215, the virtualization environment is exited. More specifically, an instruction to exit the virtualization environment can be received. The instruction can be part of an automated reboot sequence or can come from a user. In an implementation, the instruction to exit the virtualization environment can be part of a shutdown sequence of the host system. In various implementations, processes and applications associated with the virtualization environment are closed, and memory associated with the virtualization environment is freed.

At block 1220, at least a portion of a main operating system is loaded. In an implementation, boot sequences associated with the main operating system are accessed, and portions (processes, drivers, applications, etc.) of the main operating system are loaded into memory of the host system.

At block 1225, a process in the main operating system with access to the stored change in state is initiated. In various implementations, the virtualization environment state uploading engine 1120 initiates a process in the main operating systems. The process can have network access and the capability to upload data through a network connection. For example, the process At block 1230, the stored change in the state of the portion of the virtualization environment is uploaded using the process. More specifically, the virtualization environment state uploading engine 1120 can provide at least portions of the delta disk to another device using the process. In various implementations, the delta disk is provided to one or more of a virtualized compute control and management system (e.g., to the virtualized compute control and management system 130 through the network 115 shown in FIG. 1), and another virtualization environment (e.g., to one of the virtualization environment engines 110 through the virtual/logical network 135 shown in FIG. 1).

Figure 13:
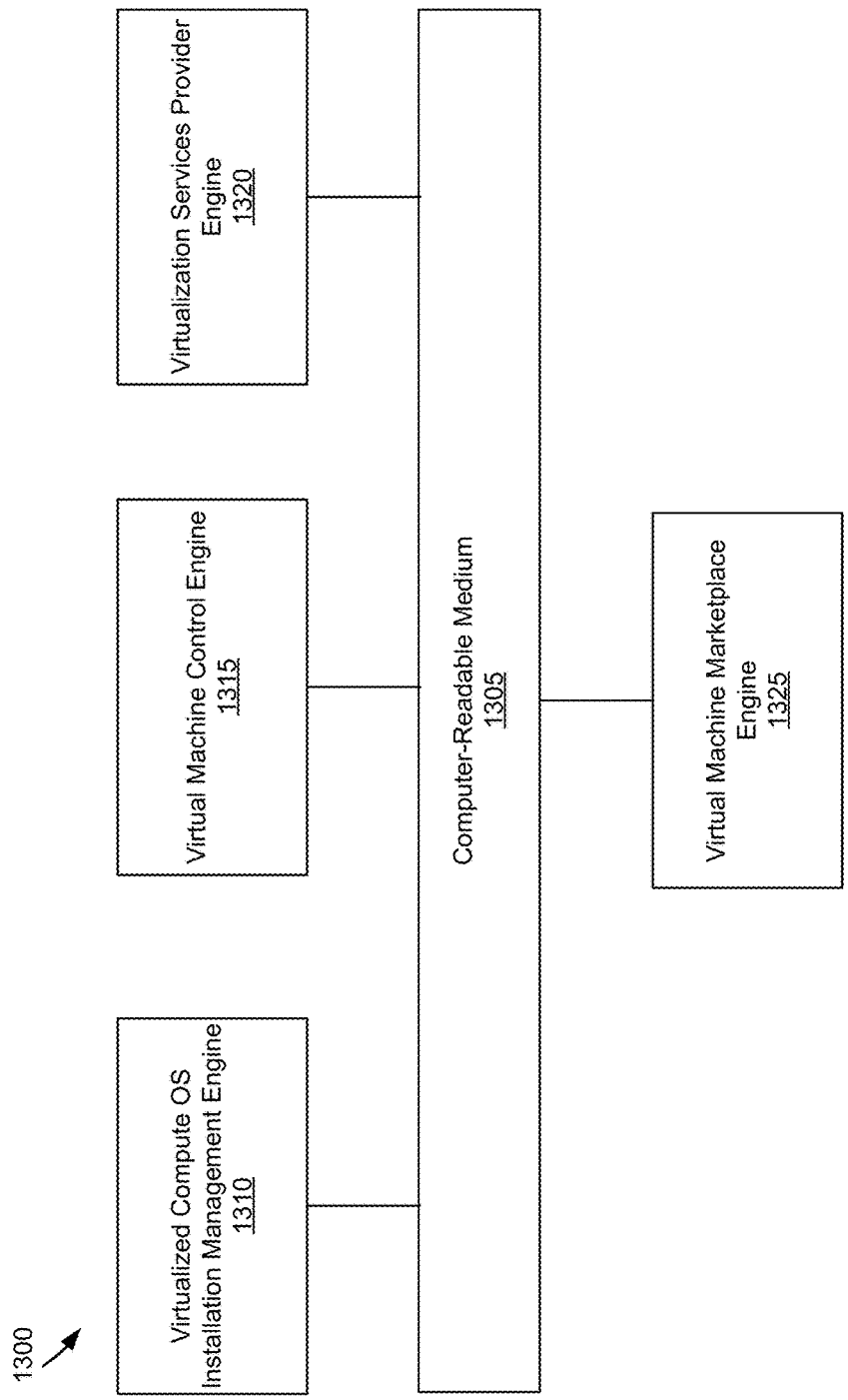
FIG. 13 depicts a diagram illustrating an example of a virtualized compute control and management system.

FIG. 13 depicts a diagram 1300 illustrating an example of a virtualized compute control and management system. The virtualized compute control and management system can correspond, in implementations, to the virtualized compute control and management system 130, shown in FIG. 1. In the example of FIG. 13, the virtualized compute control and management system can include a computer-readable medium 1305, a virtualization environment installation management engine 1310, a virtual machine control engine 1315, and a virtualization services provider engine 1320. In implementations, the computer-readable medium 1305 can include a "computer-readable medium," as described in this paper. One or more of the virtualization environment installation management engine 1310, the virtual machine control engine 1315, and the virtualization services provider engine 1320 can include an "engine," as described in this paper.

In the example of FIG. 13, the virtualization environment installation management engine 1310 is coupled to the computer-readable medium 1305. In an implementation, the virtualization environment installation management engine 1310 installs software onto a host device. The virtualization environment installation management engine 1310 can receive installation and/or other files over a network connection, over storage coupled to the host device, etc. The virtualization environment installation management engine 1310 can also manage permissions and/or security associated with such an installation.

In the example of FIG. 13, the virtual machine control engine 1315 is coupled to the computer-readable medium 1305. In a specific implementation, the virtual machine control engine 1315 controls the virtualization environment. More specifically, the virtual machine control engine 1315 can control access to the virtualization environment, states of virtualization environment, data uploading of virtualization environment, and/or quality of service and/or remote lifecycle management of virtualization environment.

In the example of FIG. 13, the virtualization services provider engine 1320 is coupled to the computer-readable medium 1305. In implementations, the virtualization services provider engine 1320 can provide access to virtual machine instances to the virtualized compute client engine 125, shown in FIG. 1. The virtualization services provider engine 1320 can support processes and/or provide services to the virtualized compute client engine 125.

In an implementation, the virtualized compute control and management system shown in the diagram 1300 of FIG. 13 operates to control and/or manage a virtualization environment. For example, the virtualization environment installation management engine 1310 can manage installation of a virtualization environment onto a host device. The virtualization environment installation management engine 1310 can send and/or receive data over a network to facilitate such an installation. Moreover, the virtual machine control engine 1315 can control virtual machine instances in the virtualization environment. Virtual machine instances can be initiated, managed, and removed from the virtualization environment. The virtual machine control engine 1315 can also manage permissions to virtual machine instances, such as lists of users, processes, and/or applications used to access virtual machine instances in the virtualization environment. The virtualization services provider engine 1320 can operate to support processes and/or provide services associated with the virtualization environment and/or the virtual machine instances to the virtualized compute client engine 125.

Figure 14:
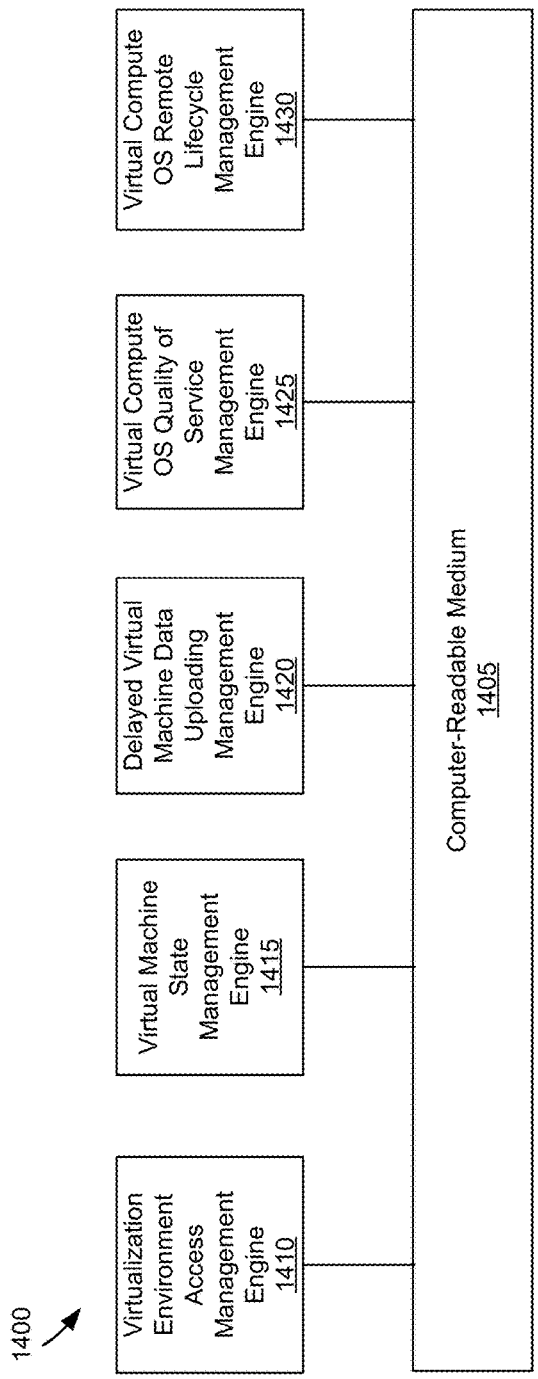
FIG. 14 depicts a diagram illustrating an example of a virtual machine control engine.

FIG. 14 depicts a diagram 1400 illustrating an example of a virtual machine control engine. The virtual machine control engine can correspond, in implementations, to the virtual machine control engine 1315, shown in FIG. 13. In the example of FIG. 14, the virtual machine control engine includes a computer-readable medium 1405, a virtualization environment access management engine 1410, a virtual machine state management engine 1415, a delayed virtual machine data uploading management engine 1420, a virtual compute OS quality of service management engine 1425, and a virtual compute OS remote lifecycle management engine 1430. In implementations, the computer-readable medium 1405 includes a "computer-readable medium," as described in this paper. In various implementations, one or more of the virtualization environment access management engine 1410, the virtual machine state management engine 1415, the delayed virtual machine data uploading management engine 1420, the virtual compute OS quality of service management engine 1425, and the virtual compute OS remote lifecycle management engine 1430 can include an "engine," as described in this paper.

In the example of FIG. 14, the virtualization environment access management engine 1410 is coupled to the computer-readable medium 1405. In a specific implementation, the virtualization environment access management engine 1410 includes lists of user accounts that have a variety of levels of permission to the virtualization environment. The virtualization environment access management engine 1410 can also include lists of user passwords and/or other authentication information related to access to the virtualization environment. In various implementations, the virtualization environment access management engine 1410 is configured to manage these permissions, passwords, and/or authentication information.

In the example of FIG. 14, the virtual machine state management engine 1415 is coupled to the computer-readable medium 1405. In a specific implementation, the virtual machine state management engine 1415 includes a listing of the various states of virtual machine instances in the virtualization environment. More specifically, the virtual machine state management engine 1415 can include a number of virtual machine instances in a virtualization environment. The virtual machine state management engine 1415 can also include the specific resources virtual machine instances in the virtualization environment are using at a given time. In an implementation, the virtual machine state management engine 1415 includes a datastore that stores the state of virtual machine instances therein. The virtual machine state management engine 1415 can also include other information related to the state of the virtualization environment.

In the example of FIG. 14, the delayed virtual machine data uploading management engine 1420 is coupled to the computer-readable medium 1405. In a specific implementation, the delayed virtual machine data uploading management engine 1420 manages delayed uploading processes as described in this paper. For example, the delayed virtual machine data uploading management engine 1420 can manage the virtual machine state data transfer engine shown in FIG. 9 and/or FIG. 3. In an implementation, the delayed virtual machine data uploading management engine 1420 manages delta disks associated with the virtual machine state data transfer engine shown in FIG. 9 and/or FIG. 3. The delayed virtual machine data uploading management engine 1420 can further manage uploading processes associated with uploading a delta disk.

In the example of FIG. 14, the virtual compute OS quality of service management engine 1425 is coupled to the computer-readable medium 1405. In a specific implementation, the virtual compute OS quality of service management engine 1425 manages quality of service matters, such as quality of service throttling. In various implementations, the virtual compute OS quality of service management engine 1425 manages issues related to error rates of communications from the network to the virtualization environment, bandwidth, throughput, transmission delays, network availability, jitter, etc.

In the example of FIG. 14, the virtual compute OS remote lifecycle management engine 1430 is coupled to the computer-readable medium 1405. In an implementation, the virtual compute OS remote lifecycle management engine 1430 manages attributes associated with the lifecycle of the virtualization environment and/or virtual machine instances executed in the virtualization environment. For example, the virtual compute OS remote lifecycle management engine 1430 can manage the lifecycle of virtual machine instances by managing service strategies. As virtualization extends from a transparent back-end alternative to a full infrastructure offering within the organization, the virtual compute OS remote lifecycle management engine 1430 can provide controls to enable wholly new delivery models, from short-term provisioning to outsourced virtual machine hosting. The virtual compute OS remote lifecycle management engine 1430 can also manage service design. For example, when designing the virtual infrastructure services, the virtual compute OS remote lifecycle management engine 1430 can consider the structure of the individual virtual machine instances given to the customer as well as the interactions between all of the virtual machine instances in the virtualization environment, as they come online, move, and expire. The virtual compute OS remote lifecycle management engine 1430 can also manage service transition. More specifically, the virtual compute OS remote lifecycle management engine 1430 can augment traditional set(s) of requirements built into delivering an infrastructure component to the business.

The virtual compute OS remote lifecycle management engine 1430 can employ best practices and/or specific tools can be used to create the right controls within each virtual machine instance, ensuring the behavior of all the virtual machine instances is in line with the design. In an implementation, the virtual compute OS remote lifecycle management engine 1430 manages service operation. For example, the virtual compute OS remote lifecycle management engine 1430 can minimize management needs with strong controls set in the transition phase and ongoing monitoring and alerting specifically designed to address the unique characteristics of the virtualization environment and/or virtual machines therein. In an implementation, the virtual compute OS remote lifecycle management engine 1430 provides continual service improvement. More specifically, as virtual environments mature and grow, internal customers and management will be keen to understand the savings and benefits of the paradigm, security groups will increasingly audit the infrastructure, and new chargeback methods will emerge to account for the new model. In an implementation, the virtual compute OS remote lifecycle management engine 1430, with its innate understanding of the environment and its transient and mobile nature, delivers the metrics needed to demonstrate success to all the constituents.

In a specific implementation, the virtual machine control engine shown in the diagram 1400 operates to control a virtualization environment on a host system and/or virtual machine instances in the virtualization environment. More specifically, the virtualization environment access management engine 1410 can manage access to a virtualization environment. The virtualization environment access management engine 1410 can further authenticate user credentials and/or passwords to access the virtualization environment. The virtual machine state management engine 1415 can operate to manage states of virtual machine instances in the virtualization environment being accessed. More specifically, the virtual machine state management engine 1415 can identify specific virtual machine instances in a virtualization environment for which state needs to be managed. The virtual machine state management engine 1415 can store these states locally or in a networked storage resource. In an implementation, the virtual compute OS quality of service management engine 1425 operates to manage the quality of service associated with the virtualization environment and/or virtual machine instances executed in the virtualization environment. Further, the virtual compute OS remote lifecycle management engine 1430 can operate to perform remote lifecycle management related to virtual machine instances executed in the virtualization environment.

Figure 15:
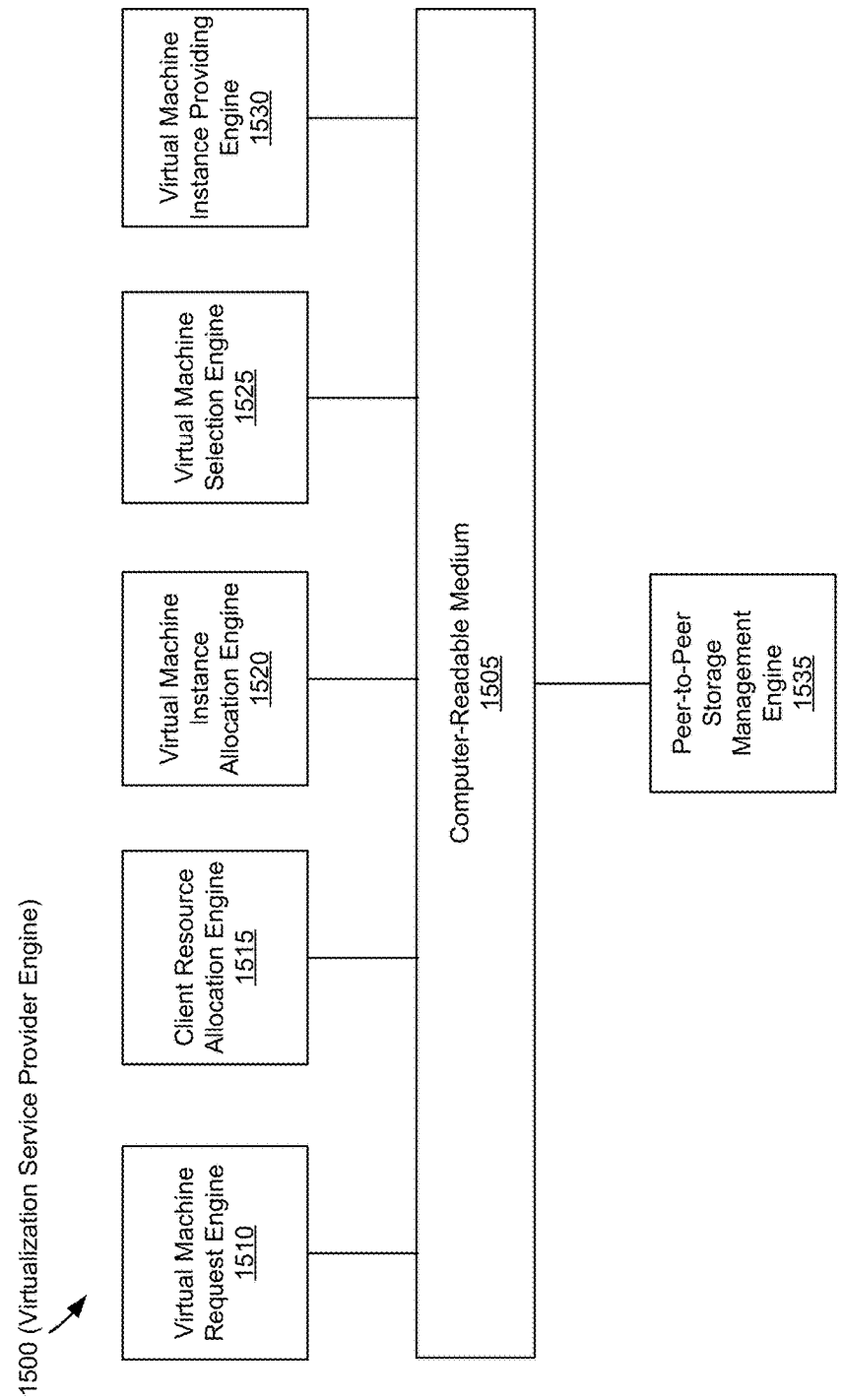
FIG. 15 depicts a diagram illustrating an example of a virtualization service provider engine.

FIG. 15 depicts a diagram 1500 illustrating an example of a virtualization service provider engine. The virtualization service provider engine can correspond, in implementations, to the virtualization services provider engine 1320, shown in FIG. 13. In the example of FIG. 15, the virtualization service provider engine includes a computer-readable medium 1505, a virtual machine request engine 1510, a client resource allocation engine 1515, a virtual machine instance allocation engine 1520, a virtual machine selection engine 1525, a virtual machine instance providing engine 1530, and a peer-to-peer storage management engine 1535. In implementations, the computer-readable medium 1505 can include a "computer-readable medium," as described in this paper. One or more of the virtual machine request engine 1510, the client resource allocation engine 1515, the virtual machine instance allocation engine 1520, the virtual machine selection engine 1525, the virtual machine instance providing engine 1530, and the peer-to-peer storage management engine 1535 can include an "engine," as described in this paper.

In the example of FIG. 15, the virtual machine request engine 1510 is coupled to the computer-readable medium 1505. In an implementation, the virtual machine request engine 1510 receives requests for virtualized resources. The virtual machine request engine 1510 can receive, for instance, requests for virtualized processors, virtualized memory, virtualized storage, virtualized network resources, etc. In an implementation, the virtual machine request engine 1510 receives requests for specific virtual machine instances in the virtualization environment.

In the example of FIG. 15, the client resource allocation engine 1515 is coupled to the computer-readable medium 1505. The client resource allocation engine 1515 can identify a set of virtualized resources a virtualization can support. In various implementations, the client resource allocation engine 1515 identifies virtualized processors, virtualized memory, virtualized storage, virtualized network resources, etc. that a specific virtualization environment can support. For example, the client resource allocation engine 1515 can identify how much processor, memory, storage, and/or network resources a host system can provide to support a given virtualization environment.

In the example of FIG. 15, the virtual machine instance allocation engine 1520 is coupled to the computer-readable medium 1505. In some implementations, the virtual machine instance allocation engine 1520 can determine how many virtual machine instances should be allocated to the virtualization environment.

In the example of FIG. 15, the virtual machine selection engine 1525 is coupled to the computer-readable medium 1505. In a specific implementation, the virtual machine selection engine 1525 includes a listing of specific virtual machine instances that can be supported by the virtualized resources of the virtualization environment. The virtual machine selection engine 1525 can provide this listing to clients seeking virtual machine instances. For example, the virtual machine selection engine 1525 can provide a client with specific virtual machine instances, and specific virtualized resources that can be supported by those specific virtual machine instances. The virtual machine selection engine 1525 can also receive selection of virtual machine instances that a client is requesting.

In the example of FIG. 15, the virtual machine instance providing engine 1530 is coupled to the computer-readable medium 1505. In implementations, the virtual machine instance providing engine 1530 interfaces with the network to provide identifiers of specific virtual machine instances that a client is to have access to. For example, the virtual machine instance providing engine 1530 can provide a client with pointers, memory locations, and/or other locations of specific virtual machine instances in the virtualization environment. In a specific implementation, the virtual machine instance providing engine 1530 streams particular virtual machine instances to a client.

In the example of FIG. 15, the peer-to-peer storage management engine 1535 is coupled to the computer-readable medium 1505. In a specific implementation, the peer-to-peer storage management engine 1535 manages peer-to-peer storage between virtualization environments across different host devices. For example, the peer-to-peer storage management engine 1535 can manage peer-to-peer storage between storage nodes, such as the first virtualization environment engine 110-1 and the Nth virtualization environment engine 110-*n*, shown in FIG. 1. In various implementations, the peer-to-peer storage management engine 1535 uses the virtual/logical network 135 to manage peer-to-peer storage between storage nodes. The peer-to-peer storage management engine 1535 can also manage disk, memory, etc. on specific storage nodes.

In a specific implementation, the virtualization service provider engine in the diagram 1500 operates to provide and manage virtual machine instances in a virtualization environment. The virtual machine request engine 1510 can operate to receive requests for virtual machines. The client resource allocation engine 1515 can operate to identify the virtualized resources that are available. The virtual machine instance allocation engine 1520 can identify virtual machine instances that can support the available virtualized resources. The virtual machine selection engine 1525 can operate to select specific virtual machine instances that are identified to support the virtualized resources. The virtual machine instance providing engine 1530 can operate to provide locations of the selected virtual machine instances to the client. The virtual machine instance providing engine 1530 can further operate to connect the client to these selected virtual machine instances. In an implementation, the peer-to-peer storage management engine 1535 manages peer-to-peer storage between host systems. More specifically, the peer-to-peer storage management engine 1535 can operate to manage peer-to-peer storage over a peer-to-peer network, e.g., a peer-to-peer network formed between the virtualization environment engines 110-1 and 110-*n* through the virtual/logical network 135 shown in FIG. 1.

Figure 16:
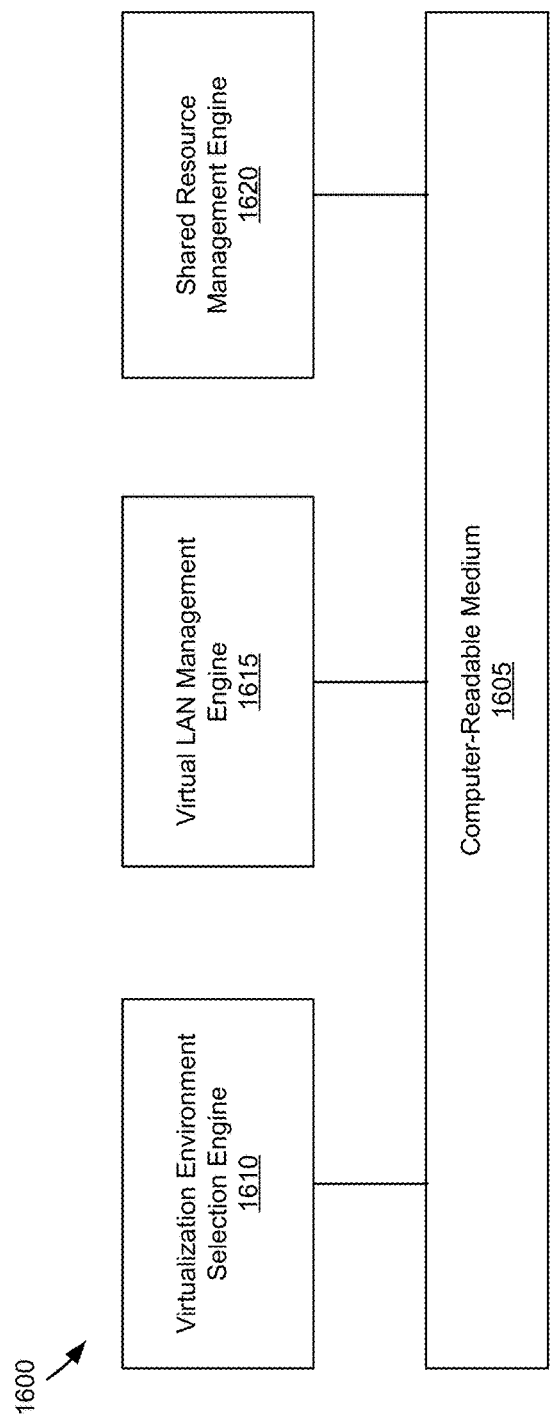
FIG. 16 depicts a diagram illustrating an example of a peer-to-peer storage management engine.

FIG. 16 depicts a diagram 1600 illustrating an example of a peer-to-peer storage management engine. The peer-to-peer storage management engine can correspond to the peer-to-peer storage management engine 1535 shown in FIG. 15. The peer-to-peer storage management engine in the diagram 1600 includes a computer-readable medium 1605, a virtualization environment selection engine 1610, a virtual LAN management engine 1615, and a shared resource management engine 1620. In implementations, the computer-readable medium 1605 includes a "computer-readable medium," as described in this paper. One or more of the virtualization environment selection engine 1610, the virtual LAN management engine 1615, and the shared resource management engine 1620 can include an "engine," as described in this paper.

In the example of FIG. 16, the virtualization environment selection engine 1610 is coupled to the computer-readable medium 1605. In a specific implementation, the virtualization environment selection engine 1610 identifies virtualization environments for peer-to-peer storage. More specifically, the virtualization environment selection engine 1610 can identify a plurality of virtualization environments on specific host systems that can support shared storage between those host systems. In a specific implementation, the virtualization environment selection engine 1610 provides identifiers of specific virtualization environments to other modules, such as the virtual LAN management engine 1615.

In the example of FIG. 16, the virtual LAN management engine 1615 is coupled to the computer-readable medium 1605. In a specific implementation, the virtual LAN management engine 1615 establishes a network connection between virtualization environments. In some implementations, the network connection comprises a secure network connection. For example, the network connection established by the virtual LAN management engine 1615 can include Generic Routing Encapsulation (GRE) and/or Internet Protocol Security (IPSec) tunnels to facilitate a secure connection between identified virtualization environments. In some implementations, the virtual LAN between virtualization environments includes a peer-to-peer network between the virtualization environments. The virtual LAN maintained by the virtual LAN management engine 1615 can also allow specific virtualization environments to access one another as nodes on a virtual LAN.

In the example of FIG. 16, the shared resource management engine 1620 is coupled to the computer-readable medium 1605. In a specific implementation, the shared resource management engine 1620 creates and/or manages shared resources between identified virtualization environments. More specifically, the shared resource management engine 1620 can manage virtual processors, virtual memory, virtual storage, and/or virtual network connections that are to be shared between identified virtualization environments. In an implementation, the shared resource management engine 1620 creates and/or manages peer-to-peer storage between specific virtualization environments over the virtual LAN maintained by the virtual LAN management engine 1615. For example, the shared resource management engine 1620 can manage a virtualized computer cluster that shares processors, virtual memory, virtual storage, and/or virtual network connections maintained by the identified virtualization environments over the virtual LAN.

In a specific implementation, the peer-to-peer storage management engine shown in the diagram 1600 operates to maintain peer-to-peer storage between virtualization environments. More specifically, the virtualization environment selection engine 1610 can identify a plurality of virtualization environments for peer-to-peer storage. More specifically, the virtualization environment selection engine 1610 can operate to poll host systems having virtualization environments executing therein for virtualized resources that can be used to support peer-to-peer storage. The virtualization environment selection engine 1610 can further provide identifiers of virtualization environments to other engines, such as the virtual LAN management engine 1615.

Further, the virtual LAN management engine 1615 can operate to manage a VLAN between the plurality of virtualization environments identified by the virtualization environment selection engine 1610. More specifically, if a VLAN has not been created between the plurality of virtualization environments, the virtual LAN management engine 1615 can create the VLAN. In various implementations, the virtual LAN management engine 1615 can manage a VLAN that has been created between the plurality of virtualization environments.

In an implementation, the shared resource management engine 1620 can maintain a virtualized computer cluster on the plurality of virtualization environments. The virtualized computer cluster can allow for the sharing of virtual processors, virtual memory, virtual storage, and/or virtual network connections maintained by the identified virtualization environments over the virtual LAN.

Figure 17:
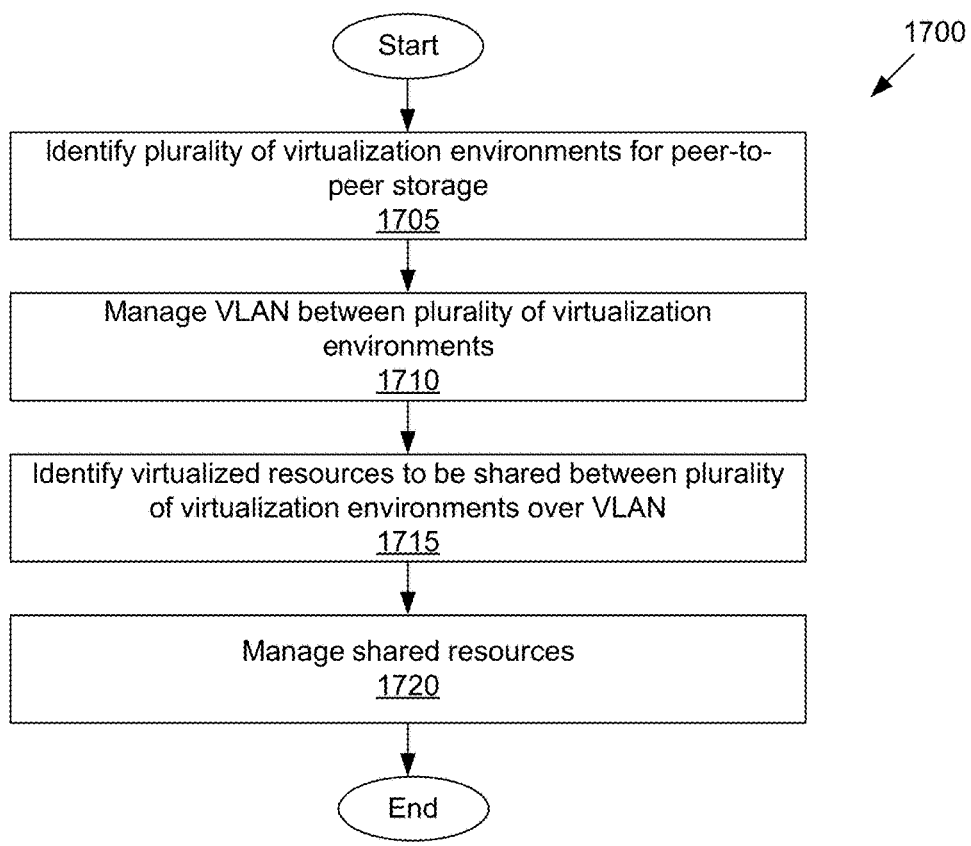
FIG. 17 depicts a flowchart of an example of a method for maintaining peer-to-peer storage between virtualization environment engines.

FIG. 17 depicts a flowchart 1700 of an example of a method for maintaining peer-to-peer storage between virtualization environment engines. In a specific implementation, the method can be implemented using a peer-to-peer storage management engine, such as the peer-to-peer storage management engine shown in the diagram 1600 in FIG. 16. At block 1705, a plurality of virtualization environments is identified for peer-to-peer storage. In a specific implementation, the virtualization environment selection engine 1610 identifies a plurality of virtualization environments for peer-to-peer storage. At block 1710, a VLAN is managed between the plurality of virtualization environments. In a specific implementation, the virtual LAN management engine 1615 manages a VLAN between the plurality of virtualization environments identified by the virtualization environment selection engine 1610. At block 1715, virtualized resources that are to be shared between the plurality of virtualization environments over the VLAN are identified. In a specific implementation, the shared resource management engine 1620 identifies virtual processors, virtual memory, virtual storage, and/or virtual network connections that are to be shared between identified virtualization environments. At block 1720, the shared resources are managed. In some implementations, the shared resource management engine 1620 manages the shared resources. More specifically, the shared resource management engine 1620 maintains a virtualized computer cluster on the plurality of virtualization environments.

Figure 18:
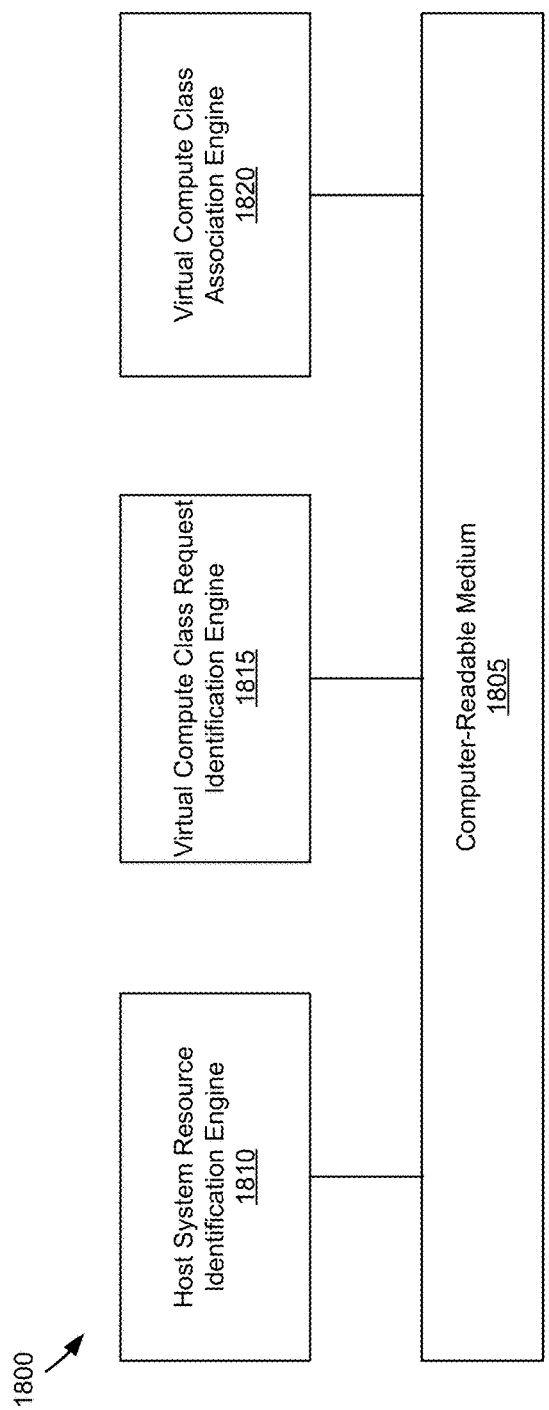
FIG. 18 depicts a diagram illustrating an example of a client resource allocation engine.

FIG. 18 depicts a diagram 1800 illustrating an example of a client resource allocation engine. The client resource allocation engine in the diagram 1800 can correspond to the client resource allocation engine 1515, shown in FIG. 15 and discussed in more detail in this paper. In the example of FIG. 18, the client resource allocation engine includes a computer-readable medium 1805, a host system resource identification engine 1810, a virtual compute class request identification engine 1815, and a virtual compute class association engine 1820. The computer-readable medium 1805 can include a "computer-readable medium," as discussed in this paper. One or more of the host system resource identification engine 1810, the virtual compute class request identification engine 1815, and the virtual compute class association engine 1820 can include an "engine," as described in this paper.

In the example of FIG. 18, the host system resource identification engine 1810 is coupled to the computer-readable medium 1805. In a specific implementation, the host system resource identification engine 1810 interfaces with host systems, such as the host systems 105, shown in FIG. 1 and discussed further in this paper. The host system resource identification engine 1810 can further receive identifiers corresponding to virtual resources the host systems support. In an implementation, the host system resource identification engine 1810 identifies a level of security the host systems support. More specifically, the host system resource identification engine 1810 cab identify whether host systems have secure hardware and/or secure software protocols that would support additional security for virtualization environments and/or virtual machine instances executed thereon.

In the example of FIG. 18, the virtual compute class request identification engine 1815 is coupled to the computer-readable medium 1805. In an specific implementation, the virtual compute class request identification engine 1815 interfaces with compute access systems, such as the compute access system 120, shown in FIG. 1, to identify virtual compute classes the compute access systems are requesting access to. As an example, the virtual compute class request identification engine 1815 can provide to compute access systems a selectable list of virtual compute classes that the compute access systems can request access to. It is noted the virtual compute class request identification engine 1815 can provide other ways to identify virtual compute classes without departing from the scope and substance of the inventive concepts discussed in this paper. The virtual compute class request identification engine 1815 can also receive selections of specific compute classes the compute access systems are requesting, and can provide requested virtual compute classes to other engines.

In the example of FIG. 18, the virtual compute class association engine 1820 is coupled to the computer-readable medium 1805. The virtual compute class association engine 1820 can receive identified virtual resources and/or other information from the host system resource identification engine 1810, and can receive, from the virtual compute class request identification engine 1815 and/or other engines, the virtual compute classes the compute access systems have requested. The virtual compute class association engine 1820 can further identify whether the requested virtual compute classes are available for use by the compute access systems. In a specific implementation, the virtual compute class association engine 1820 can determine prices of requested virtual compute classes. In a specific implementation, the virtual compute class association engine 1820 can associate available virtual compute instances with requests for specific virtual compute classes. The virtual compute class association engine 1820 can also facilitate payments for virtual compute instances that are provided.

In some implementations, the client resource allocation engine in the diagram 1800 operates to identify available classes of virtualized resources, and associate specific requests for virtual machine instances with the available classes of virtualized resources. More specifically, the host system resource identification engine 1810 can identify a plurality of host systems. In a specific implementation, the host system resource identification engine 1810 identifies one or more of the host systems 105 in the virtualized compute environment of the diagram 100 that have virtualization environments executing thereon. Further, the virtual compute class request identification engine 1815 can identify the resources of each of the plurality of host systems. More particularly, the virtual compute class request identification engine 1815 can determine whether one or more of the host systems have virtualized processors, virtualized memory, virtualized storage, and/or virtualized network resources to provide to virtualized compute client engines. The virtual compute class request identification engine 1815 can classify resources of each of the plurality of host systems into virtual machine classes. Virtual machine classes can share one or more attributes, including hardware configurations, software configurations, network configurations, etc. Virtual machine classes can also share common levels of security and/or security configurations. The virtual compute class association engine 1820 can receive requests for virtual machine instances, can associate these requests with virtual machine instances corresponding to the virtual machine classes, and can fulfill the requests with virtualized computing operating system resources that are associated with the virtual machine class.

Figure 19:
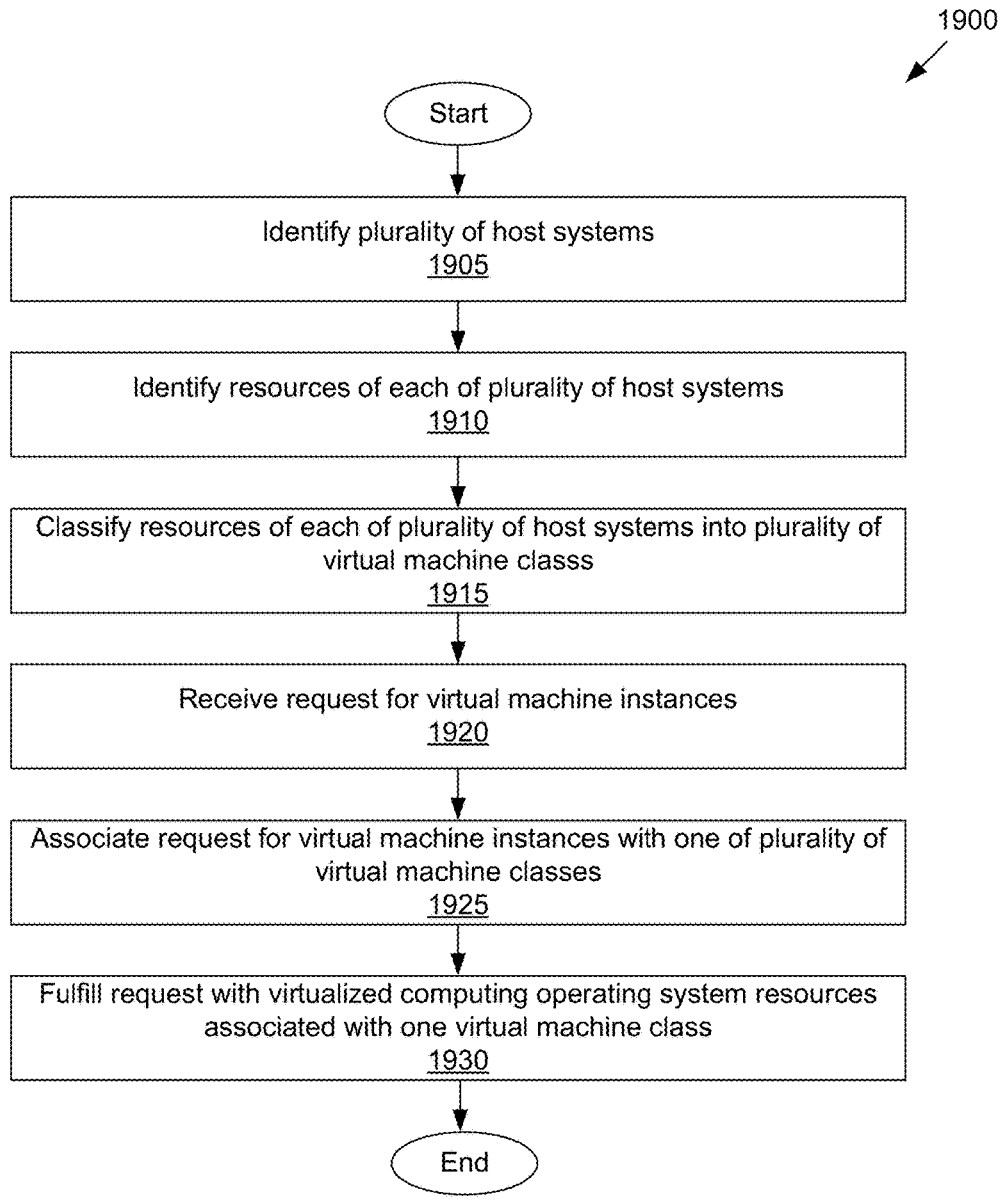
FIG. 19 depicts a flowchart of an example of a method for providing a plurality of virtual machine classes.
Figure 20:
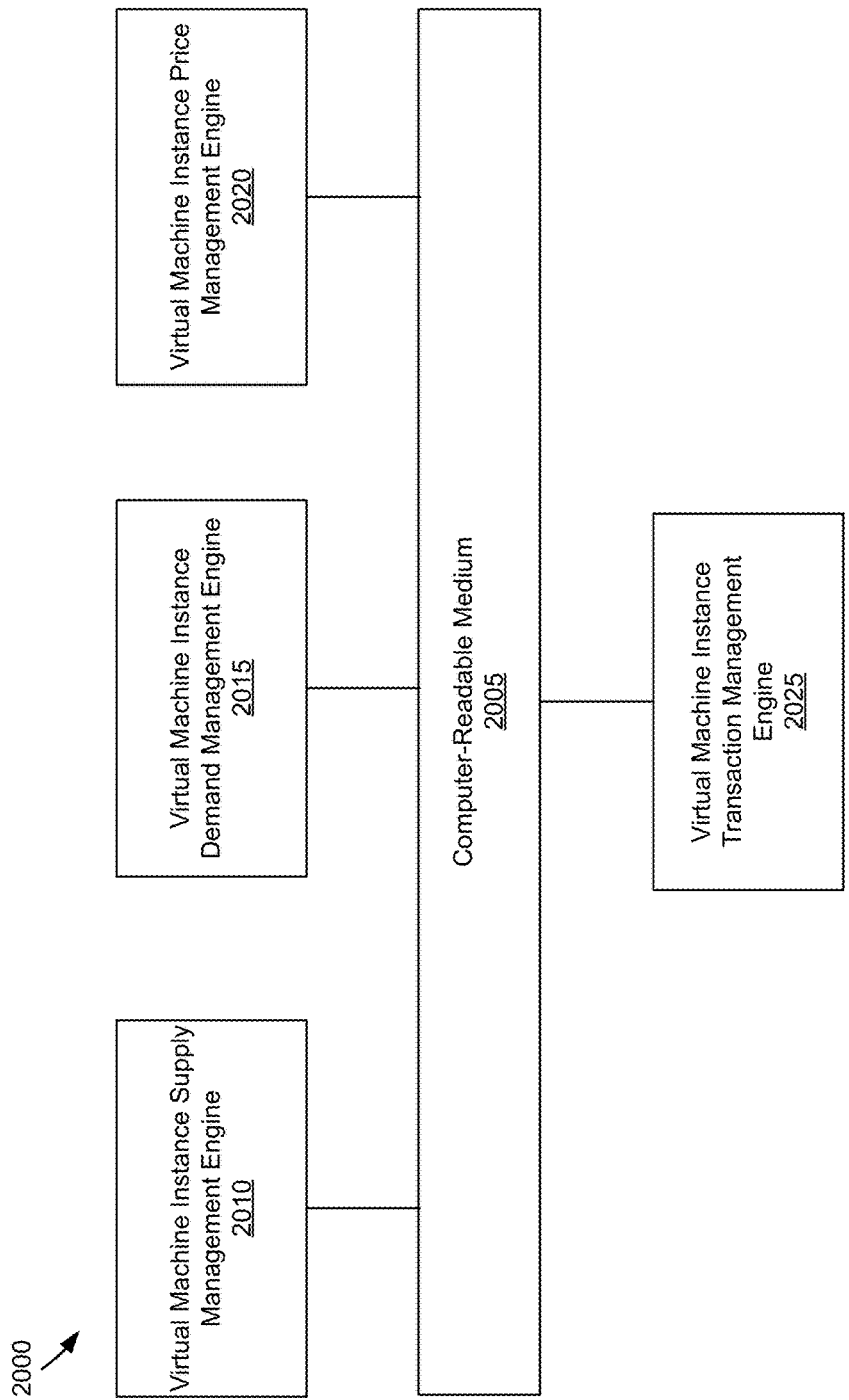
FIG. 20 depicts a diagram illustrating an example of a virtual machine marketplace engine.

FIG. 19 depicts a flowchart 1900 of an example of a method for providing a plurality of virtual machine classes. One or more of the blocks of the flowchart 1900 can be implemented using the virtualized compute control and management system 130. At block 1905, a plurality of host systems are identified. At block 1910, resources of each of plurality of host systems are identified. At block 1915, resources of each of plurality of host systems are classified into a plurality of virtual machine tiers. At block 1920, a request for virtual machine instances is received. At block 1925, the request for virtual machine instances is associated with one of plurality of virtual machine tiers. At block 1930, the request is fulfilled with virtualized computing operating systems resources associated with one virtual machine tier FIG. 20 depicts a diagram 2000 illustrating an example of a virtual machine marketplace engine. In the example of FIG. 20, the virtual machine marketplace engine includes a computer-readable medium 2005, a virtual machine instance supply management engine 2010, a virtual machine instance demand management engine 2015, a virtual machine instance price management engine 2020, and a virtual machine instance transaction management engine 2025. The computer-readable medium 1805 can include a "computer-readable medium," as discussed in this paper. One or more of the virtual machine instance supply management engine 2010, the virtual machine instance demand management engine 2015, the virtual machine instance price management engine 2020, and the virtual machine instance transaction management engine 2025 can include an "engine," as described herein.

In the example of FIG. 20, the virtual machine instance supply management engine 2010 is coupled to the computer-readable medium 2005. In a specific implementation, the virtual machine instance supply management engine 2010 receives notifications from host systems, such as the host systems 105, shown in FIG. 1 and discussed further in this paper. The notifications can provide to the virtual machine instance supply management engine 2010 whether these host systems are providing virtual machine instances that are available for clients. In some implementations, the virtual machine instance supply management engine 2010 maintains a datastore of virtual machine instances that are available for access. For example, the virtual machine instance supply management engine 2010 can maintain a database of virtual machine instances that are ready for utilization but not being utilized. It is noted the virtual machine instance supply management engine 2010 can also identify portions of a virtualization environment or portions of a host system that are ready for utilization but not being utilized.

In the example of FIG. 20, the virtual machine instance demand management engine 2015 is coupled to the computer-readable medium 2005. In a specific implementation, the virtual machine instance demand management engine 2015 receives notifications from virtualized compute client engines, such as the virtualized compute client engine 125, shown in FIG. 1 and discussed further in this paper. The notifications can provide to the virtual machine instance demand management engine 2015 whether these virtualized compute client engines are requesting virtual machine instances. The notifications can also provide the number and/or types of virtual machine instances requested by the virtualized compute client engines.

In the example of FIG. 20, the virtual machine instance price management engine 2020 is coupled to the computer-readable medium 2005. In a specific implementation, the virtual machine instance price management engine 2020 includes one or more datastores that calculate the price of specific virtual machine. More specifically, the virtual machine instance price management engine 2020 can facilitate an auction for virtual compute instances to virtual compute client engines. The auction can receive bids for virtual compute instances. The auction can determine whether these bids correspond to virtual compute instances that are available to be provided to virtualized compute client engines. In a specific implementation, the virtual machine instance price management engine 2020 can calculate and/or set prices for virtual compute instances based on the supply of and/or demand for virtual compute instances.

In the example of FIG. 20, the virtual machine instance transaction management engine 2025 is coupled to the computer-readable medium 2005. In a specific implementation, the virtual machine instance transaction management engine 2025 can manage transactions associated with virtual machine instances. For example, the virtual machine instance transaction management engine 2025 can transfer rights to access virtual machine instances that have been sold. The virtual machine instance transaction management engine 2025 can also facilitate payment for the rights to access virtual machine instances that have been sold.

In a specific implementation, the virtual machine marketplace engine in the diagram 2000 operates to sell virtual compute instances from host systems to virtual compute client engines. More specifically, the virtual machine instance supply management engine 2010 can determine a supply of virtual compute instances available on the host systems. The virtual machine instance demand management engine 2015 can operate to determine the demand for these virtual compute instances. The demand can be based on specific requests from virtualized compute client engines or other sources.

The virtual machine instance price management engine 2020 can determine prices for available virtual compute instances. For example, the virtual machine instance price management engine 2020 can facilitate an auction for virtual compute instances. In a specific implementation, at least a portion of the auction can include a multi-unit auction where more than one virtual compute instance is sold to a single bidder. At least a portion of the auction can also include a uniform price auction where a fixed number of identical (or nearly identical) virtual compute instances are sold for the same price. Each bidder in such a uniform price auction can submit bids, designating both the quantity of the virtual compute instances desired and the price they are willing to pay per virtual compute instance. The bids can be sealed or concealed from other bidders until a later time, such as when the uniform price auction closes. The auctioneer can serve the highest bidder first, giving them the number of virtual compute instances requested, then the second highest bidder and so forth until the supply of virtual compute instances is exhausted. All bidders can then pay a per unit price equal to the lowest winning bid (the lowest bid out of the buyers who actually received one or more virtual compute instances)—regardless of their actual bid. Some variations of this auction can have the winners paying the highest losing bid rather than the lowest winning bid. In some implementations, the uniform price auction comprises a call market or double auction that is used to aggregate a quantity of virtual machine instances offered by more than one seller to multiple buyers. Such a call market/double auction can share characteristics of an open market mechanism in which all buyers and all sellers interested in trading a virtual machine instance can participate simultaneously. The clearing price auction is often used in a market context in order to establish a benchmark price index for that market in question.

In some implementations, the prices for the auction can depend on a virtual compute classes being auctioned. For example, the auction can sell virtual compute instances corresponding to at least three virtual compute classes: on demand virtual compute classes, reserved virtual compute classes, and spot virtual compute classes. On demand virtual compute classes can include virtual compute instances that are available when bidders seek them. Reserved virtual compute classes can include virtual compute instances that are available for fixed amounts of time. Spot virtual compute classes can include virtual compute instances that are available at a given time but their availability cannot be predicted or is difficult to predict. Spot virtual compute classes can, for example, include virtual compute instances that are not being used at a given time, e.g., excess capacity. As another example, the auction can sell virtual compute instances that have common hardware configurations, common software configurations, common security configurations, etc. Once the auction model has been implemented, the virtual machine instance transaction management engine 2025 can manage transactions associated with virtual machine instances, including facilitating payment and/or transfer of rights to virtual compute instances.

Figure 21:
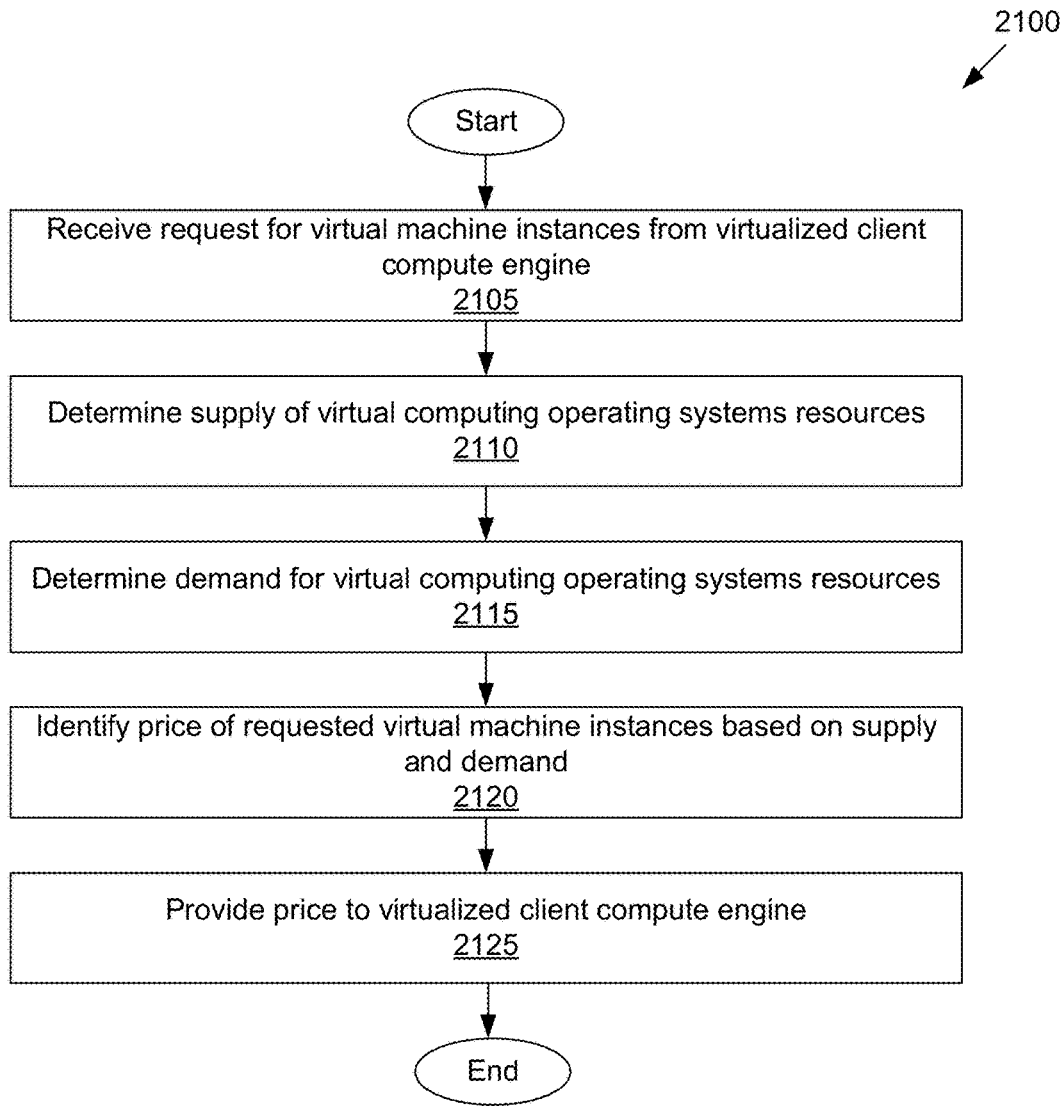
FIG. 21 depicts a flowchart of an example of a method for coordinating transfer of one or more virtual machine instances.

FIG. 21 depicts a flowchart 2100 of an example of a method for coordinating transfer of one or more virtual machine instances. One or more of the blocks of the flowchart 2100 can be implemented using the virtualized compute control and management system 130. At block 2105, a request for virtual machine instances is received from virtualized client compute engine. At block 2110, the supply of virtual computing operating systems resources. At block 2115, the demand for virtual computing operating systems resources is determined. At block 2120, the prices of the requested virtual machine instances is identified based on the supply and the demand. An auction model can be used to determine these prices. At block 2125, the prices is provided to the virtualized client compute engine.

Figure 22:
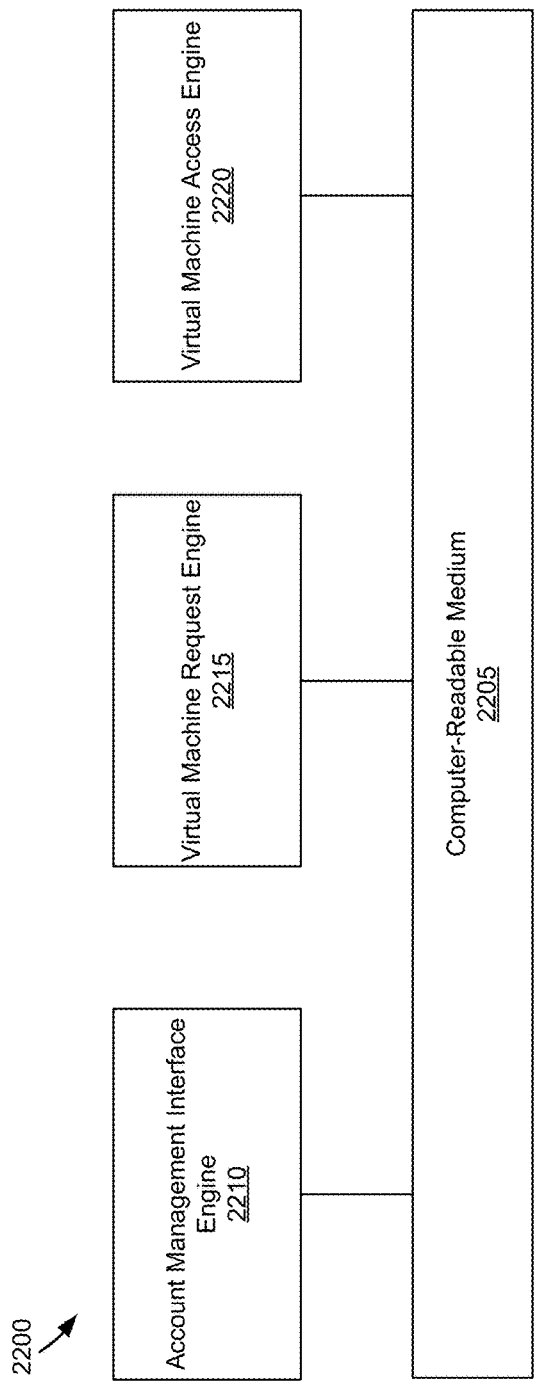
FIG. 22 depicts a diagram illustrating an example of a virtualized compute client engine.

FIG. 22 depicts a diagram 2200 illustrating an example of a virtualized compute client engine. The virtualized compute client engine can correspond, in implementations, to the virtualized compute client engine 125, shown in FIG. 1. In the example of FIG. 22, the virtualized compute client engine includes a computer-readable medium 2205, an account management engine 2210, a virtual machine request engine 2215, and a virtual machine access engine 2220. In implementations, the computer-readable medium 2205 can include a "computer-readable medium," as described in this paper. One or more of the account management engine 2210, the virtual machine request engine 2215, and the virtual machine access engine 2220 can include an "engine," as described in this paper.

In the example of FIG. 22, the account management engine 2210 is coupled to the computer-readable medium 2205. In a specific implementation, the account management engine 2210 maintains one or more databases that store user account information. User account information can include financial and/or other information related to specific users of compute access client engines. User account information can also include device information related to compute access systems. In some implementations, the account management engine 2210 maintains user account information related to host systems and/or users of host systems. The account management engine 2210 can further maintain configurations of host systems, information related to virtualization environments executed on host systems, and/or information related to virtual machine instances executed on virtualization environments.

In the example of FIG. 22, the virtual machine request engine 2215 is coupled to the computer-readable medium 2205. In a specific implementation, the virtual machine request engine 2215 manages requests for virtual machine instances. The virtual machine request engine 2215 can further provide these requests to other engines and/or allow these requests to be satisfied using the techniques described in this paper. In the example of FIG. 22, the virtual machine access engine 2220 is coupled to the computer-readable medium 2205. In a specific implementation, the virtual machine access engine 2220 provides access to virtual machine instances. More specifically, the virtual machine access engine 2220 manages the virtualized compute access client is to have permission to virtual machine instances.

In a specific implementation, the virtualized compute client engine shown in the diagram 2200 operates to manage access to virtual machine instances. More specifically, the account management engine 2210 can manage user accounts of users associated with the virtualized compute client engine. The virtual machine request engine 2215 can manage requests for specific virtual machine instances and/or specific virtualization environments. Further, the virtual machine access engine 2220 can manage access to specific virtual machine instances and/or specific virtualization environments.

Figure 23:
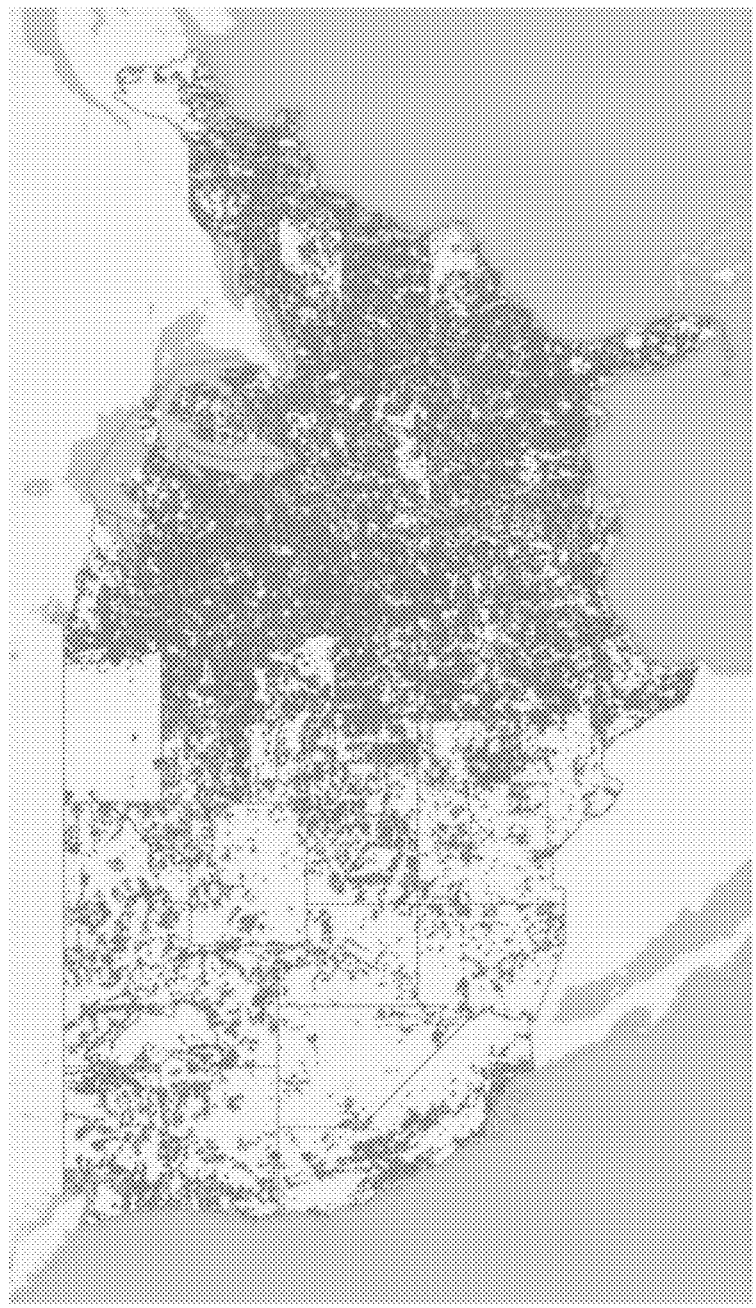
FIG. 23 depicts diagrams of a map of Internet Service Provider data.
Figure 24:
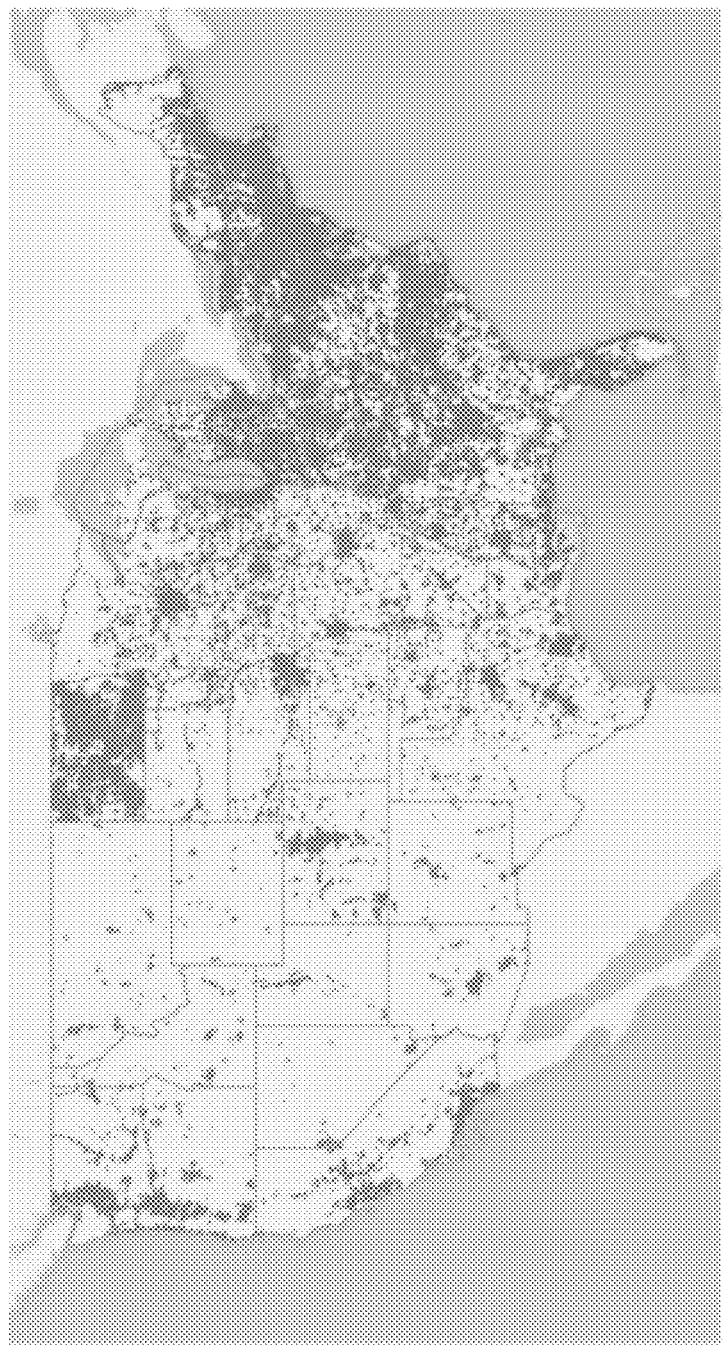
FIG. 24 depicts diagrams of a map of Internet Service Provider data.
Figure 25:
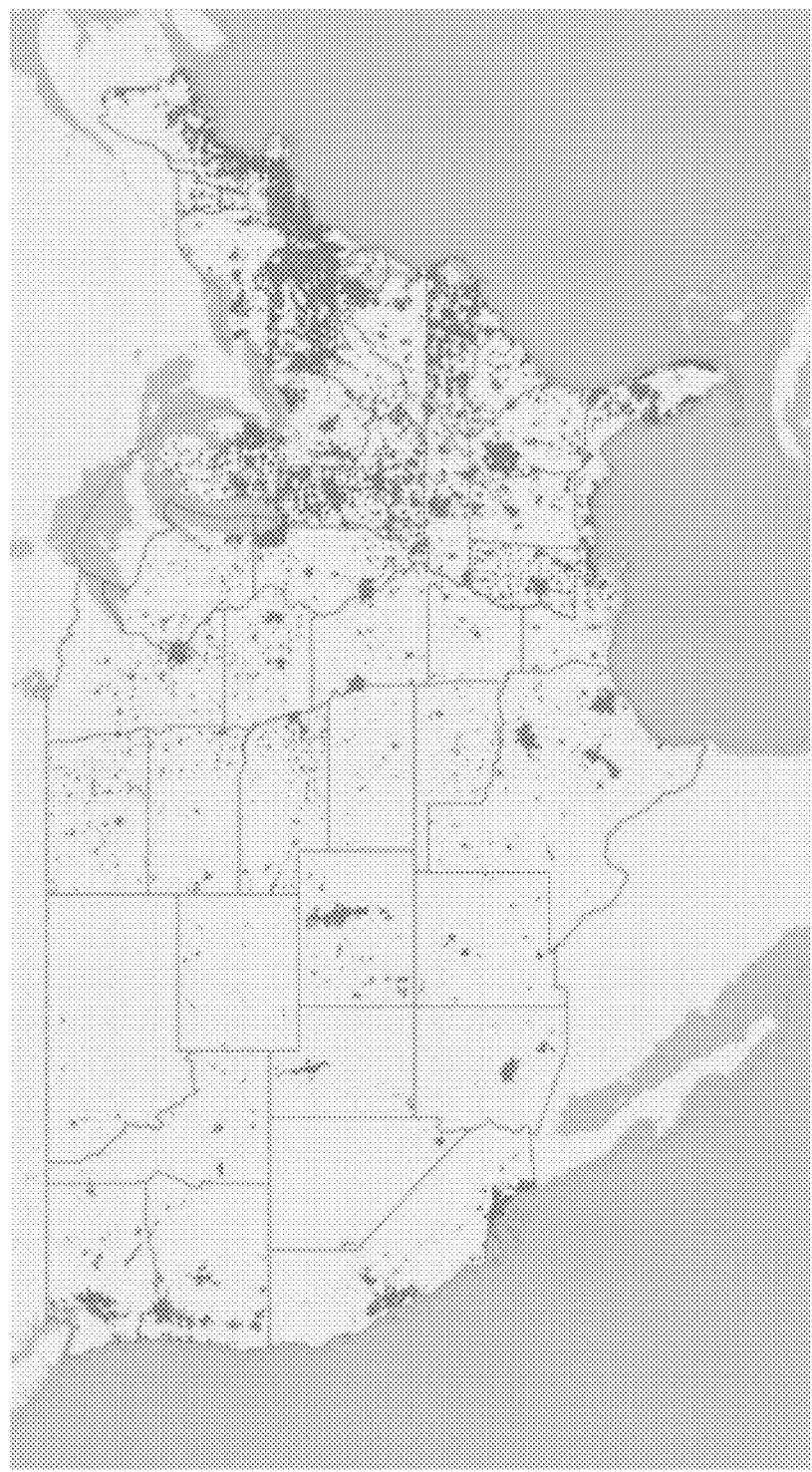
FIG. 25 depicts diagrams of a map of Internet Service Provider data.

FIG. 23 depicts a diagram 2300 of a map of Internet Service Provider data. The diagram shows parts of the United States having a single Internet Service Provider (ISP) as of Jun. 30, 2013. FIG. 24 depicts a diagram 2400 of a map of Internet Service Provider data. The diagram 2400 shows parts of the United States having a two or more ISPs as of Jun. 30, 201. FIG. 25 depicts a diagram 2500 of a map of Internet Service Provider data. The diagram 2500 shows parts of the United States having a three or more ISPs as of Jun. 30, 2013. As shown in FIGS. 23-25, there are less portions of the United States having three ISPs than there are portions of the United States having two ISPs or one ISP. Further, there are less portions of the United States having two ISPs than there are portions of the United States having one ISP. This means that in many places in the United States, individual consumers seeking computing resources can be constrained by the actions of a few ISPs. These constraints can form a bottleneck to virtualization, particularly for consumers who are unable or not willing to pay for additional accelerated network resources. The techniques described in this paper can greatly benefit end users by providing unutilized or underutilized computing resources through virtualizing portions of computers that are unused or underutilized.

Figure 26:
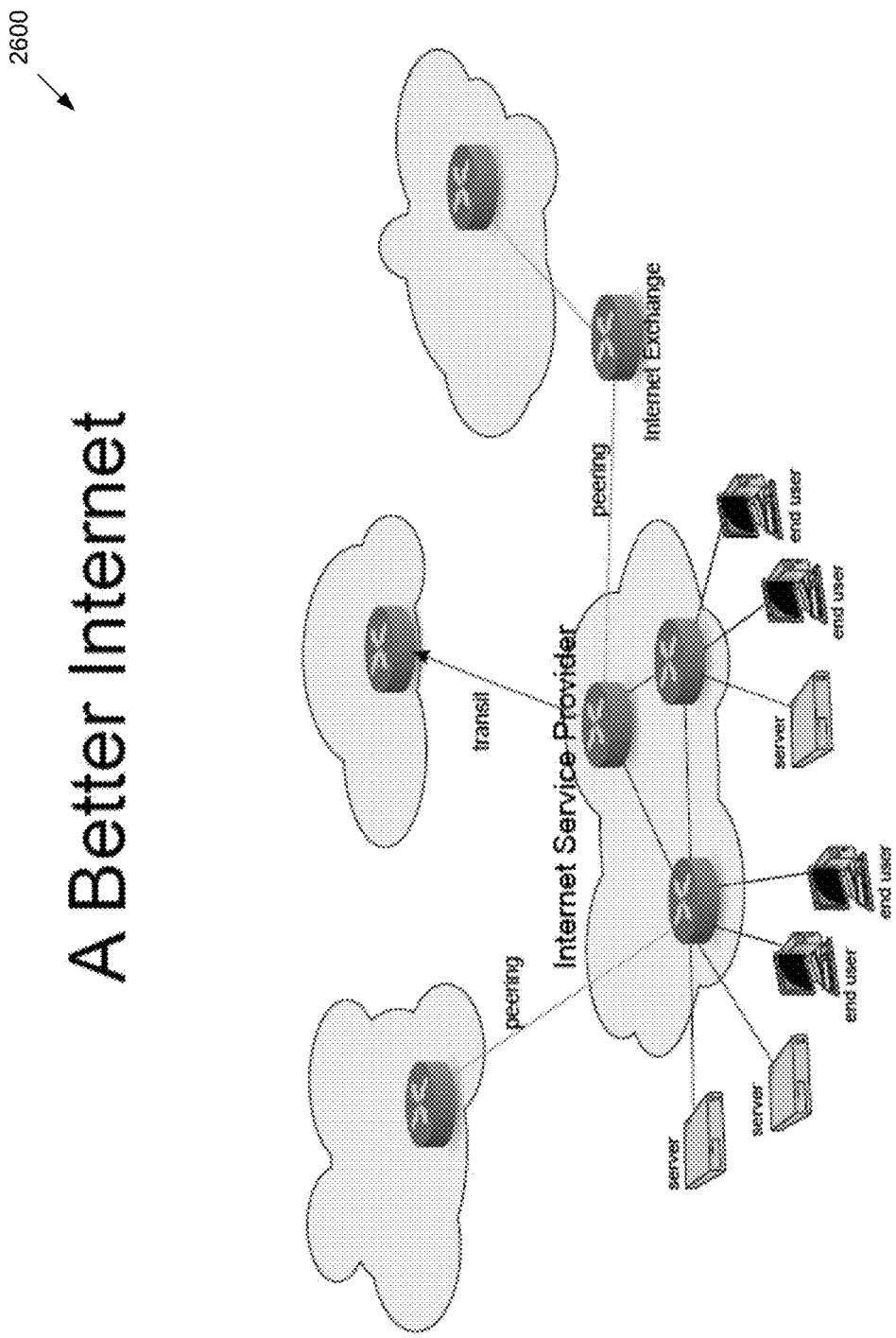
FIG. 26 depicts a diagram illustrating an example of a virtualized compute environment.

FIG. 26 depicts a diagram 2600 illustrating an example of a virtualized compute environment. As shown in the diagram 2600, an ISP can connect a plurality of devices to each other and to other ISPs. Within the same ISP, multiple host devices (labeled "servers" in FIG. 26) could implement virtualization environment engines to provide virtual machine instances to compute access systems (labeled "end user" in FIG. 26). This could be very efficient and solve fundamental issues of net neutrality problems potentially facing networks.

Figure 27:
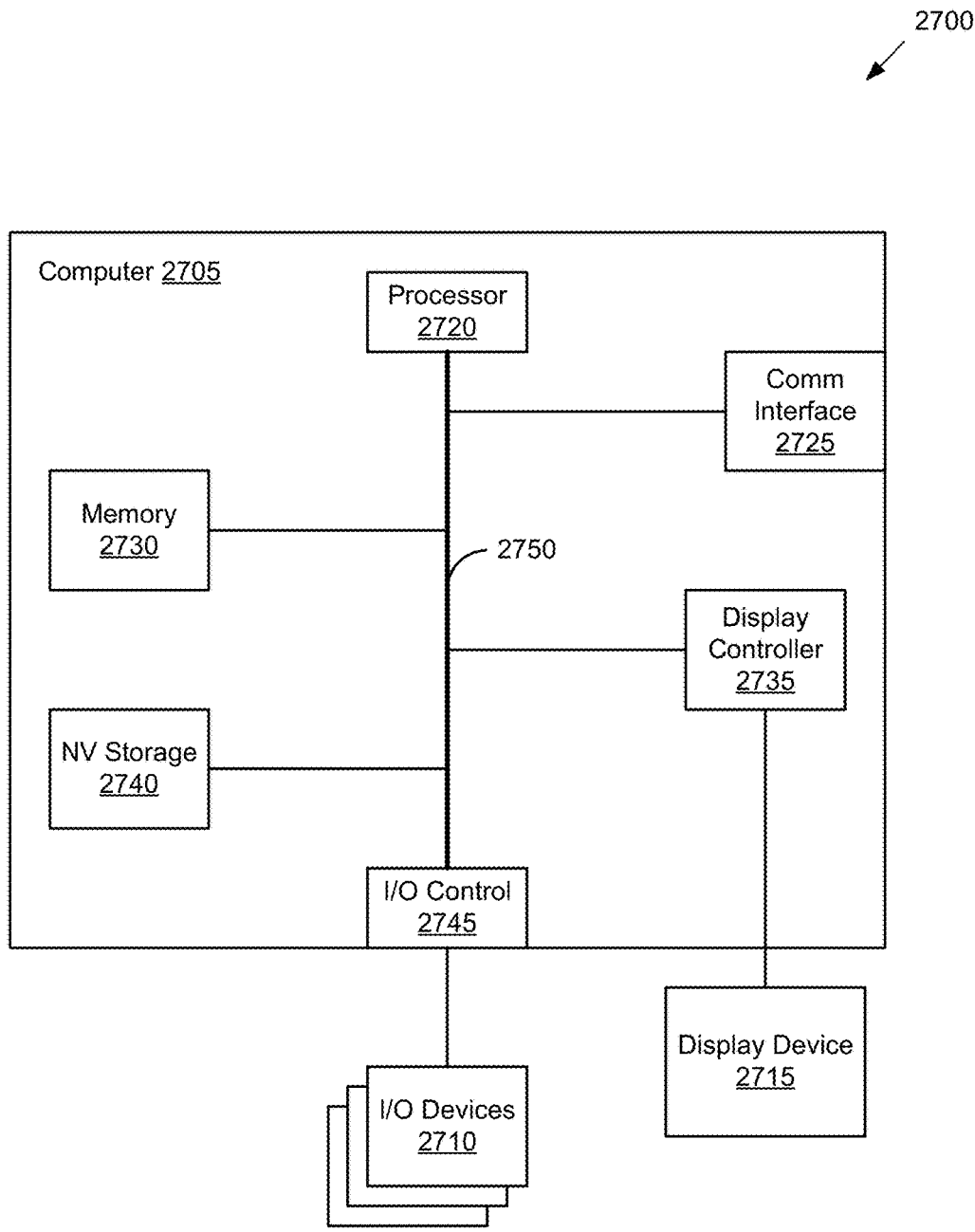
FIG. 27 depicts an example of a computer system.

FIG. 27 shows an example of a computer system 2700 on which techniques described in this paper can be implemented. The computer system 2700 can be a conventional computer system that can be used as a client computer system, such as a wireless client or a workstation, or a server computer system. The computer system 2700 includes a computer 2705, I/O devices 2730, and a display device 2715. The computer 2705 includes a processor 2720, a communications interface 2725, memory 2730, display controller 2735, non-volatile storage 2740, and I/O controller 2745. The computer 2705 can be coupled to or include the I/O devices 2730 and display device 2715.

The computer 2705 interfaces to external systems through the communications interface 2725, which can include a modem or network interface. It will be appreciated that the communications interface 2725 can be considered to be part of the computer system 2700 or a part of the computer 2705. The communications interface 2725 can be an analog modem, ISDN modem, cable modem, token ring interface, satellite transmission interface (e.g. "direct PC"), or other interfaces for coupling a computer system to other computer systems.

The processor 2720 can be, for example, a conventional microprocessor such as an Intel Pentium microprocessor or Motorola power PC microprocessor. The memory 2730 is coupled to the processor 2720 by a bus 2720. The memory 2730 can be Dynamic Random Access Memory (DRAM) and can also include Static RAM (SRAM). The bus 2720 couples the processor 2720 to the memory 2730, also to the non-volatile storage 2740, to the display controller 2735, and to the I/O controller 2745.

The I/O devices 2730 can include a keyboard, disk drives, printers, a scanner, and other input and output devices, including a mouse or other pointing device. The display controller 2735 can control in the conventional manner a display on the display device 2715, which can be, for example, a cathode ray tube (CRT) or liquid crystal display (LCD). The display controller 2735 and the I/O controller 2745 can be implemented with conventional well-known technology.

The non-volatile storage 2740 is often a magnetic hard disk, an optical disk, or another form of storage for large amounts of data. Some of this data is often written, by a direct memory access process, into memory 2730 during execution of software in the computer 2705. One of skill in the art will immediately recognize that the terms "machine-readable medium" or "computer-readable medium" includes any type of storage device that is accessible by the processor 2720 and also encompasses a carrier wave that encodes a data signal.

The computer system 2700 is one example of many possible computer systems that have different architectures. For example, personal computers based on an Intel microprocessor often have multiple buses, one of which can be an I/O bus for the peripherals and one that directly connects the processor 2720 and the memory 2730 (often referred to as a memory bus). The buses are connected together through bridge components that perform any necessary translation due to differing bus protocols.

Network computers are another type of computer system that can be used in conjunction with the teachings described in this paper. Network computers do not usually include a hard disk or other mass storage, and the executable programs are loaded from a network connection into the memory 2730 for execution by the processor 2720. A Web TV system, which is known in the art, is also considered to be a computer system, but it can lack some of the features shown in FIG. 27, such as certain input or output devices. A typical computer system will usually include at least a processor, memory, and a bus coupling the memory to the processor.

Though FIG. 27 shows an example of the computer system 2700, it is noted that the term "computer system," as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 27.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but can or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used in this paper, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described in this paper, including clients, servers, and engines, can be compatible with or implemented using a cloud-based computing system. As used in this paper, a cloud-based computing system is a system that provides computing resources, software, and/or information to client devices by maintaining centralized services and resources that the client devices can access over a communication interface, such as a network. The cloud-based computing system can involve a subscription for services or use a utility pricing model. Users can access the protocols of the cloud-based computing system through a web browser or other container application located on their client device.

This paper describes techniques that those of skill in the art can implement in numerous ways. For instance, those of skill in the art can implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task can be implemented as a general component that is configured to perform the task at a given time or a specific component that is manufactured to perform the task. As used in this paper, the term 'processor' refers to one or more devices, circuits, and/or processing cores configured to process data, such as computer program instructions.

A detailed description of one or more implementations of the invention is provided in this paper along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention can be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general-purpose computer selectively activated or reconfigured by a computer program stored in the computer. Such a computer program can be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

What is claimed is:

1. A system comprising: a main operating system interface engine configured to receive instructions from a main operating system of a host system of a plurality of host systems; a virtualization environment management engine coupled to the main operating system interface engine and operative to manage a virtualization environment of the host system, the virtualization environment using a virtualized operating system, the virtualized operating system appearing distinct from the main operating system of the host system to a user of the host system; the virtualization environment management engine operative to receive one or more instructions to supply a requested number of virtual machine instances from the plurality of host systems; in response to the one or more instructions to supply the requested number of virtual machine instances from the plurality of host systems: a virtual compute class request identification engine is coupled to the virtualization environment management engine and is operative to identify virtualized resources available to execute virtual machine instances from excess compute resources of the host system, a virtual machine management engine coupled to the virtualization environment management engine and operative to determine a number of one or more virtual machine instances that can be supported in the virtualization environment, each of the one or more virtual machine instances operative to provide at least a respective portion of the virtualized resources of the host system for a compute access system coupled to the plurality of host systems, a virtualized compute class association engine coupled to the virtual machine management engine and operative to, based on the virtualized resources, determine one or more virtual machine tiers that are supported by the virtualization environment for the one or more virtual machine instances of the host system, each of the one or more virtual machine tiers corresponding to a different class of virtualized resources of the plurality of host systems, and the virtualized compute class association engine is further operative to: identify that the host system is configured to support a particular class of a first virtualized resource of the virtualized resources for the virtualization environment, determine a particular amount of a second virtualized resource of the virtualization resources is available for the virtualization environment, based on the particular class of the first virtualized resource and the particular amount of the second virtualized resource, determine that a particular virtual machine tier of the one or more virtual machine tiers is supported by the virtualization environment of the host system; and wherein the virtual machine management engine comprises a tiered virtual machine selection engine operative to select a respective virtual machine tier, of the one or more virtual machine tiers to associate with each of the one or more virtual machine instances of the host system.

2. The system of claim 1, wherein a file system of the virtualized operating system is visible to a user of the main operating system when the user of the main operating system is within the main operating system.

3. The system of claim 1, wherein the main operating system resides on a first disk partition of the host system, and the virtualized operating system resides on a second disk partition of the host system.

4. The system of claim 1, further comprising a state data transfer engine coupled to the virtualization environment management engine and operative to save a present state of the virtualization environment to a virtualization state file on the host system.

5. The system of claim 4, wherein the state data transfer engine is coupled to the virtual machine management engine and is operative to save a present state of the one or more virtual machine instances to the virtualization state file.

6. The system of claim 4, wherein the virtualization state file comprises a delta disk file that represents a difference of the present state of the virtualization environment and a prior state of the virtualization environment.

7. The system of claim 4, further comprising a delayed virtual machine data uploading engine coupled to the state data transfer engine and operative to upload the virtualization state file to a virtualized compute control and management system using an uploading process executed within the main operating system.

8. The system of claim 7, wherein the uploading process is initiated in response to booting the main operating system.

9. The system of claim 1, further comprising a virtualization environment security engine coupled to the virtualization environment management engine and operative to provide security for the virtualization environment.

10. The system of claim 9, wherein the virtualization environment security engine is coupled to secure hardware of the host system and uses the secure hardware to provide the security for the virtualization environment.

11. The system of claim 10, wherein the secure hardware comprises a chip configured to securely cryptographically sign data in the virtualization environment, wherein in an operation, the securely cryptographically signed data is used to verify that an operating system image of the virtualized operating system is trusted and, after the virtualized operating system is trusted, secure disk access is enabled.

12. The system of claim 9, wherein the virtualization environment security engine is operative to stream at least a portion of the virtualization environment to the compute access system using encrypted blocks secured from decryption by the main operating system.

13. The system of claim 12, wherein the encrypted blocks emulate the virtualized resources.

14. The system of claim 10, wherein the secure hardware is compatible with a centralized shared key, wherein, in an operation, the centralized shared key is shared with the virtualized operating system and used to decrypt disk blocks.

15. The system of claim 9, wherein in an operation, a virtual machine specific key is generated for the one or more virtual machine instances in the virtualization environment of the host system which has a virtual disk or portion of a virtual disk allocated to virtual machine instance hosting functionality or a delta disk where local changes to a central image are stored, wherein the virtual machine specific key is never written to disk, thereby preventing virtual machine images of the one or more virtual machine instances associated with the host system from being decrypted by an untrusted operating system image.

16. The system of claim 1, wherein each of the one or more virtual machine tiers corresponds to a different level of security for the one or more virtual machine instances.

17. The system of claim 1, wherein at least one of the one or more virtual machine tiers uses secure hardware to provide security for virtual machine instances associated with the at least one of the one or more virtual machine tiers.

18. The system of claim 17, wherein the secure hardware comprises a chip configured to hash a virtualized operating system image, cryptographically sign data to be tamper-resistant generating a signed hash included in the data, and send the data to the virtualization environment management engine while retaining tamper-resistance, wherein the virtualization environment management engine compares the signed hash against a known good hash and, if the signed hash and the known good hash match, trusts the virtualized operating system image.

19. The system of claim 1, wherein each of the one or more virtual machine tiers is based on one or more classification criteria, the one or more classification criteria dependent on one or more of: network bandwidth, network latency, processor performance, storage capacity, storage performance, and available run-time memory.

20. The system of claim 1, further comprising a virtualized compute control and management system coupled to the host system and operative to manage the virtualization environment.

21. The system of claim 20, wherein the virtualized compute control and management system is operative to manage a quality of service associated with the virtualization environment.

22. The system of claim 20, wherein the virtualized compute control and management system is operative to manage a remote lifecycle associated with the virtualization environment.

23. The system of claim 20, wherein the plurality of host systems comprises a first host system and a second host system coupled to the first host system using a logical network, and the virtualized compute control and management system is operative to manage peer-to-peer storage between the first host system and the second host system.

24. The system of claim 20, wherein the plurality of host systems comprises a first host system and a second host system coupled to the first host system using a logical network, and the virtualized compute control and management system is operative to manage a computer cluster formed between the first host system and the second host system.

25. The system of claim 20, wherein the plurality of host systems comprises a first host system and a second host system coupled to the first host system using a logical network, and the virtualized compute control and management system is operative to balance a computing load between the first host system and the second host system.

26. The system of claim 20, wherein the plurality of host systems comprises a first host system and a second host system coupled to the first host system using a logical network, and the virtualized compute control and management system is operative to create one or more secure private networks between the first host system and the second host system.

27. A computer-implemented method comprising: receiving instructions from a main operating system of a host system of a plurality of host systems; wherein the host system includes a virtualization environment, the virtualization environment using a virtualized operating system, the virtualized operating system appearing distinct from the main operating system of the host system to a user of the host system; receiving one or more instructions to supply a requested number of virtual machine instances from the plurality of host systems; in response to the one or more instructions to supply the requested number of virtual machine instances from the plurality of host systems: identifying virtualized resources available to execute virtual machine instances from excess compute resources of the host system, determining a number of one or more virtual machine instances that can be supported in the virtualization environment, each of the one or more virtual machine instances operative to provide at least a respective portion of the virtualized resources of the host system for a compute access system coupled to the plurality of host systems, and based on the virtualized resources, determining one or more virtual machine tiers that are supported by the virtualization environment, for the one or more virtual machine instances of the host system, each of the one or more virtual machine tiers corresponding to a different class of virtualized resources of the plurality of host systems, wherein determining the one or more virtual machine tiers that are supported further comprises: identifying that the host system is configured to support a particular class of a first virtualized resource of the virtualized resources for the virtualization environment, determining a particular amount of a second virtualized resource of the virtualization resources is available for the virtualization environment, based on the particular class of the first virtualized resource and the particular amount of the second virtualized resource, determining that a particular virtual machine tier of the one or more virtual machine tiers is supported by the virtualization environment of the host system; and selecting a respective virtual machine tier, of the one or more virtual machine tiers, to associate with each of the one or more virtual machine instances.

28. The method of claim 27, wherein the main operating system resides on a first disk partition of the host system, and the virtualized operating system resides on a second disk partition of the host system.

29. The method of claim 27, further comprising storing a present state of the virtualization environment to a virtualization state file on the host system.

30. The method of claim 29, wherein storing a present state of the one or more virtual machine instances to the virtualization state file.

31. The method of claim 29, wherein the virtualization state file comprises a delta disk file that represents a difference of the present state of the virtualization environment and a prior state of the virtualization environment.

32. The method of claim 29, further comprising uploading the virtualization state file to a virtualized compute control and management system using an uploading process executed within the main operating system.

33. The method of claim 32, wherein the uploading process is initiated in response to booting the main operating system.

34. The method of claim 27, wherein the host system comprises secure hardware that provides security for the virtualization environment.

35. The method of claim 34, wherein the secure hardware comprises a chip configured to securely cryptographically sign data in the virtualization environment, wherein in an operation, the securely cryptographically signed data is used to verify an operating system image of the virtualized operating system is trusted and, after the virtualized operating system is trusted, secure disk access is enabled.

36. The method of claim 27, further comprising streaming at least a portion of the virtualization environment to the compute access system using encrypted blocks secured from decryption by the main operating system.

37. The method of claim 36, wherein the encrypted blocks emulate the virtualized resources.

38. The method of claim 27, wherein each of the one or more virtual machine tiers corresponds to a different level of security for the one or more virtual machine instances.

39. The method of claim 27, wherein at least one of the one or more virtual machine tiers uses secure hardware to provide security for virtual machine instances associated with the at least one of the one or more virtual machine tiers.

40. The method of claim 27, wherein each of the one or more virtual machine tiers is based on one or more classification criteria, the one or more classification criteria dependent on one or more of: network bandwidth, network latency, processor performance, storage capacity, storage performance, and available run-time memory.

41. The method of claim 27, wherein the plurality of host systems comprises a first host system and a second host system coupled to the first host system using a logical network and further comprises peer-to-peer storage between the first host system and the second host system.

42. The method of claim 27, further comprising: receiving a request for a virtual machine instance of a certain virtual machine tier from the plurality of host systems; identifying that the one or more virtual machine tiers include the certain virtual machine tier and identifying at least one particular virtual machine instance, the one or more virtual machine instances, associated with the certain virtual machine tier; fulfilling the request for the virtual machine instance with particular virtualized resources of the particular virtual machine instance.

* * * * *